US011881387B2

(12) United States Patent
Verenchikov

(10) Patent No.: US 11,881,387 B2
(45) Date of Patent: Jan. 23, 2024

(54) TOF MS DETECTION SYSTEM WITH IMPROVED DYNAMIC RANGE

(71) Applicant: Micromass UK Limited, Wilmslow (GB)

(72) Inventor: Anatoly Verenchikov, Bar (ME)

(73) Assignee: Micromass UK Limited, Wilmslow (GB)

( * ) Notice: Subject to any disclaimer, the term of this patent is extended or adjusted under 35 U.S.C. 154(b) by 402 days.

(21) Appl. No.: 17/056,965

(22) PCT Filed: May 23, 2019

(86) PCT No.: PCT/GB2019/051416
§ 371 (c)(1),
(2) Date: May 28, 2021

(87) PCT Pub. No.: WO2019/224540
PCT Pub. Date: Nov. 28, 2019

(65) Prior Publication Data

US 2021/0210330 A1 Jul. 8, 2021

(30) Foreign Application Priority Data

May 24, 2018 (GB) ..................................... 1808530

(51) Int. Cl.
*H01J 49/40* (2006.01)
*H01J 49/00* (2006.01)
(Continued)

(52) U.S. Cl.
CPC .......... *H01J 49/406* (2013.01); *H01J 49/005* (2013.01); *H01J 49/0036* (2013.01);
(Continued)

(58) Field of Classification Search
CPC .... H01J 49/406; H01J 49/0036; H01J 49/005; H01J 49/025; H01J 49/061; H01J 49/401; H01J 49/40
(Continued)

(56) References Cited

U.S. PATENT DOCUMENTS 3,898,452 A 8/1975 Hertel
4,390,784 A 6/1983 Browning et al.
(Continued)

FOREIGN PATENT DOCUMENTS

CA 2412657 C 5/2003
CN 101171660 A 4/2008
(Continued)

OTHER PUBLICATIONS

International Search Report and Written Opinion for International Application No. PCT/EP2017/070508 dated Oct. 16, 2017, 17 pages.
(Continued)

*Primary Examiner* — Kiet T Nguyen
(74) *Attorney, Agent, or Firm* — Goodwin Procter LLP

(57) ABSTRACT

Apparatus and method are proposed for the strong improvement of dynamic range (DR) of detectors and of data systems for time-of-flight mass spectrometers (TOF MS) with periodically repetitive signals. TOF separated ions are converted into secondary particles, primarily electrons, and the flow of secondary particles is controllably attenuated to sustain the data acquisition system in a counting mode above the electronic noise threshold. The acquisition time is split between at least two time segments, characterized by alternated transmission efficiency SE of secondary particles. Using strong electron suppression (SE«1) is employed for recording intense ion peak, while counting ions with either ADC, or TDC, or ADC with extracting peak centroids. A
(Continued)

longer time segment employs an efficient electron transfer (SE=1) for detecting weak ion species. In another independent aspect, an ion-optical element is provided upstream of the ion detector and is configured to deflect, reflect or retard ions such that ions that have been scattered or fragmented in the time of flight region do not impact on the ion detector.

18 Claims, 7 Drawing Sheets

(51) Int. Cl.
*H01J 49/02* (2006.01)
*H01J 49/06* (2006.01)

(52) U.S. Cl.
CPC .......... *H01J 49/025* (2013.01); *H01J 49/061* (2013.01); *H01J 49/401* (2013.01)

(58) Field of Classification Search
USPC .......................................................... 250/287
See application file for complete search history.

(56) References Cited

U.S. PATENT DOCUMENTS 4,691,160 A 9/1987 Ino
4,731,532 A 3/1988 Frey et al.
4,855,595 A 8/1989 Blanchard
4,970,390 A * 11/1990 Szymczak .............. H01J 49/40 250/281
5,017,780 A 5/1991 Kutscher et al.
5,107,109 A 4/1992 Stafford, Jr. et al.
5,128,543 A 7/1992 Reed et al.
5,202,563 A 4/1993 Cotter et al.
5,331,158 A 7/1994 Dowell
5,367,162 A 11/1994 Holland et al.
5,396,065 A 3/1995 Myerholtz et al.
5,435,309 A 7/1995 Thomas et al.
5,464,985 A 11/1995 Cornish et al.
5,619,034 A 4/1997 Reed et al.
5,652,427 A 7/1997 Whitehouse et al.
5,654,544 A 8/1997 Dresch
5,689,111 A 11/1997 Dresch et al.
5,696,375 A 12/1997 Park et al.
5,719,392 A 2/1998 Franzen
5,763,878 A 6/1998 Franzen
5,777,326 A 7/1998 Rockwood et al.
5,834,771 A 11/1998 Yoon et al.
5,847,385 A 12/1998 Dresch
5,869,829 A 2/1999 Dresch
5,896,829 A 4/1999 Rothenberg et al.
5,955,730 A 9/1999 Kerley et al.
5,994,695 A 11/1999 Young
6,002,122 A 12/1999 Wolf
6,013,913 A 1/2000 Hanson
6,020,586 A 2/2000 Dresch et al.
6,080,985 A 6/2000 Welkie et al.
6,107,625 A 8/2000 Park
6,160,256 A 12/2000 Ishihara
6,198,096 B1 3/2001 Le Cocq
6,229,142 B1 5/2001 Bateman et al.
6,271,917 B1 8/2001 Hagler
6,300,626 B1 10/2001 Brock et al.
6,316,768 B1 11/2001 Rockwood et al.
6,337,482 B1 1/2002 Francke
6,384,410 B1 5/2002 Kawato
6,393,367 B1 5/2002 Tang et al.
6,437,325 B1 8/2002 Reilly et al.
6,455,845 B1 9/2002 Li et al.
6,469,295 B1 10/2002 Park
6,489,610 B1 12/2002 Barofsky et al.
6,504,148 B1 1/2003 Hager
6,504,150 B1 1/2003 Verentchikov et al.
6,534,764 B1 3/2003 Verentchikov et al.
6,545,268 B1 4/2003 Verentchikov et al.
6,570,152 B1 5/2003 Hoyes
6,576,895 B1 6/2003 Park
6,580,070 B2 6/2003 Cornish et al.
6,591,121 B1 7/2003 Madarasz et al.
6,614,020 B2 9/2003 Cornish
6,627,877 B1 9/2003 Davis et al.
6,646,252 B1 11/2003 Gonin
6,647,347 B1 11/2003 Roushall et al.
6,664,545 B2 12/2003 Kimmel et al.
6,683,299 B2 1/2004 Fuhrer et al.
6,694,284 B1 2/2004 Nikoonahad et al.
6,717,132 B2 4/2004 Franzen
6,734,968 B1 5/2004 Wang et al.
6,737,642 B2 5/2004 Syage et al.
6,744,040 B2 6/2004 Park
6,744,042 B2 6/2004 Zajfman et al.
6,747,271 B2 6/2004 Gonin et al.
6,770,870 B2 8/2004 Vestal
6,782,342 B2 8/2004 LeGore et al.
6,787,760 B2 9/2004 Belov et al.
6,794,643 B2 9/2004 Russ, IV et al.
6,804,003 B1 10/2004 Wang et al.
6,815,673 B2 11/2004 Plomley et al.
6,833,544 B1 12/2004 Campbell et al.
6,836,742 B2 12/2004 Brekenfeld
6,841,936 B2 1/2005 Keller et al.
6,861,645 B2 3/2005 Franzen
6,864,479 B1 3/2005 Davis et al.
6,870,156 B2 3/2005 Rather
6,870,157 B1 3/2005 Zare
6,872,938 B2 3/2005 Makarov et al.
6,888,130 B1 5/2005 Gonin
6,900,431 B2 5/2005 Belov et al.
6,906,320 B2 6/2005 Sachs et al.
6,940,066 B2 9/2005 Makarov et al.
6,949,736 B2 9/2005 Ishihara
7,034,292 B1 4/2006 Whitehouse et al.
7,071,464 B2 7/2006 Reinhold
7,084,393 B2 8/2006 Fuhrer et al.
7,091,479 B2 8/2006 Hayek
7,126,114 B2 10/2006 Chernushevich
7,196,324 B2 3/2007 Verentchikov
7,217,919 B2 5/2007 Boyle et al.
7,221,251 B2 5/2007 Menegoli et al.
7,326,925 B2 2/2008 Verentchikov et al.
7,351,958 B2 4/2008 Vestal
7,365,313 B2 4/2008 Fuhrer et al.
7,385,187 B2 6/2008 Verentchikov et al.
7,388,197 B2 6/2008 McLean et al.
7,399,957 B2 7/2008 Parker et al.
7,423,259 B2 9/2008 Hidalgo et al.
7,498,569 B2 3/2009 Ding
7,501,621 B2 3/2009 Willis et al.
7,504,620 B2 3/2009 Sato et al.
7,521,671 B2 4/2009 Kirihara et al.
7,541,576 B2 6/2009 Belov et al.
7,582,864 B2 9/2009 Verentchikov
7,608,817 B2 10/2009 Flory
7,663,100 B2 2/2010 Vestal
7,675,031 B2 3/2010 Konicek et al.
7,709,789 B2 5/2010 Vestal et al.
7,728,289 B2 6/2010 Naya et al.
7,745,780 B2 6/2010 McLean et al.
7,755,036 B2 7/2010 Satoh
7,772,547 B2 8/2010 Verentchikov
7,800,054 B2 9/2010 Fuhrer et al.
7,825,373 B2 11/2010 Willis et al.
7,863,557 B2 1/2011 Brown
7,884,319 B2 2/2011 Willis et al.
7,932,491 B2 4/2011 Vestal
7,982,184 B2 7/2011 Sudakov
7,985,950 B2 7/2011 Makarov et al.
7,989,759 B2 8/2011 Hoile
7,999,223 B2 8/2011 Makarov et al.
8,017,907 B2 9/2011 Willis et al.
8,017,909 B2 9/2011 Makarov et al.
8,063,360 B2 11/2011 Willis et al.
8,080,782 B2 12/2011 Hidalgo et al.

(56) References Cited

U.S. PATENT DOCUMENTS

| | | | |
|---|---|---|---|
| 8,093,554 | B2 | 1/2012 | Makarov |
| 8,237,111 | B2 | 8/2012 | Golikov et al. |
| 8,354,634 | B2 | 1/2013 | Green et al. |
| 8,373,120 | B2 | 2/2013 | Verentchikov |
| 8,395,115 | B2 | 3/2013 | Makarov et al. |
| 8,492,710 | B2 | 7/2013 | Fuhrer et al. |
| 8,513,594 | B2 | 8/2013 | Makarov |
| 8,633,436 | B2 | 1/2014 | Ugarov |
| 8,637,815 | B2 | 1/2014 | Makarov et al. |
| 8,642,948 | B2 | 2/2014 | Makarov et al. |
| 8,642,951 | B2 | 2/2014 | Li |
| 8,648,294 | B2 | 2/2014 | Prather et al. |
| 8,653,446 | B1 | 2/2014 | Mordehai et al. |
| 8,658,984 | B2 | 2/2014 | Makarov et al. |
| 8,680,481 | B2 | 3/2014 | Giannakopulos et al. |
| 8,723,108 | B1 | 5/2014 | Ugarov |
| 8,735,818 | B2 | 5/2014 | Kovtoun et al. |
| 8,772,708 | B2 | 7/2014 | Kinugawa et al. |
| 8,785,845 | B2 | 7/2014 | Loboda |
| 8,847,155 | B2 | 9/2014 | Vestal |
| 8,853,623 | B2 | 10/2014 | Verenchikov |
| 8,884,220 | B2 | 11/2014 | Hoyes et al. |
| 8,921,772 | B2 | 12/2014 | Verenchikov |
| 8,952,325 | B2 | 2/2015 | Giles et al. |
| 8,957,369 | B2 | 2/2015 | Makarov |
| 8,975,592 | B2 | 3/2015 | Kobayashi et al. |
| 9,048,080 | B2 | 6/2015 | Verenchikov et al. |
| 9,082,597 | B2 | 7/2015 | Willis et al. |
| 9,082,604 | B2 | 7/2015 | Verenchikov |
| 9,099,287 | B2 | 8/2015 | Giannakopulos |
| 9,136,101 | B2 | 9/2015 | Grinfeld et al. |
| 9,147,563 | B2 | 9/2015 | Makarov |
| 9,196,469 | B2 | 11/2015 | Makarov |
| 9,207,206 | B2 | 12/2015 | Makarov |
| 9,214,322 | B2 | 12/2015 | Kholomeev et al. |
| 9,214,328 | B2 | 12/2015 | Hoyes et al. |
| 9,281,175 | B2 | 3/2016 | Haufler et al. |
| 9,312,119 | B2 | 4/2016 | Verenchikov |
| 9,324,544 | B2 | 4/2016 | Rather |
| 9,373,490 | B1 | 6/2016 | Nishiguchi et al. |
| 9,396,922 | B2 | 7/2016 | Verenchikov et al. |
| 9,417,211 | B2 | 8/2016 | Verenchikov |
| 9,425,034 | B2 | 8/2016 | Verentchikov et al. |
| 9,472,390 | B2 | 10/2016 | Verenchikov et al. |
| 9,514,922 | B2 | 12/2016 | Watanabe et al. |
| 9,576,778 | B2 | 2/2017 | Wang |
| 9,595,431 | B2 | 3/2017 | Verenchikov |
| 9,673,033 | B2 | 6/2017 | Grinfeld et al. |
| 9,679,758 | B2 | 6/2017 | Grinfeld et al. |
| 9,683,963 | B2 | 6/2017 | Verenchikov |
| 9,728,384 | B2 | 8/2017 | Verenchikov |
| 9,779,923 | B2 | 10/2017 | Verenchikov |
| 9,786,484 | B2 | 10/2017 | Willis et al. |
| 9,786,485 | B2 | 10/2017 | Ding et al. |
| 9,865,441 | B2 | 1/2018 | Damoc et al. |
| 9,865,445 | B2 | 1/2018 | Verenchikov et al. |
| 9,870,903 | B2 | 1/2018 | Richardson et al. |
| 9,870,906 | B1 | 1/2018 | Quarmby et al. |
| 9,881,780 | B2 | 1/2018 | Verenchikov et al. |
| 9,899,201 | B1 | 2/2018 | Park |
| 9,922,812 | B2 | 3/2018 | Makarov |
| 9,941,107 | B2 | 4/2018 | Verenchikov |
| 9,972,483 | B2 | 5/2018 | Makarov |
| 10,006,892 | B2 | 6/2018 | Verenchikov |
| 10,037,873 | B2 | 7/2018 | Wang et al. |
| 10,141,175 | B2 | 11/2018 | Verentchikov et al. |
| 10,141,176 | B2 | 11/2018 | Stewart et al. |
| 10,163,616 | B2 | 12/2018 | Verenchikov et al. |
| 10,186,411 | B2 | 1/2019 | Makarov |
| 10,192,723 | B2 | 1/2019 | Verenchikov et al. |
| 10,290,480 | B2 | 5/2019 | Crowell et al. |
| 10,373,815 | B2 | 8/2019 | Crowell et al. |
| 10,388,503 | B2 | 8/2019 | Brown et al. |
| 10,593,525 | B2 | 3/2020 | Hock et al. |
| 10,593,533 | B2 | 3/2020 | Hoyes et al. |
| 10,622,203 | B2 | 4/2020 | Veryovkin et al. |
| 10,629,425 | B2 | 4/2020 | Hoyes et al. |
| 10,636,646 | B2 | 4/2020 | Hoyes et al. |
| 2001/0011703 | A1 | 8/2001 | Franzen |
| 2001/0030284 | A1 | 10/2001 | Dresch et al. |
| 2002/0030159 | A1 | 3/2002 | Chernushevich et al. |
| 2002/0107660 | A1 | 8/2002 | Nikoonahad et al. |
| 2002/0190199 | A1 | 12/2002 | Li |
| 2003/0010907 | A1 | 1/2003 | Hayek et al. |
| 2003/0111597 | A1 | 6/2003 | Gonin et al. |
| 2003/0232445 | A1 | 12/2003 | Fulghum |
| 2004/0026613 | A1 | 2/2004 | Bateman et al. |
| 2004/0084613 | A1 | 5/2004 | Bateman et al. |
| 2004/0108453 | A1 | 6/2004 | Kobayashi et al. |
| 2004/0119012 | A1 | 6/2004 | Vestal |
| 2004/0144918 | A1 | 7/2004 | Zare et al. |
| 2004/0155187 | A1 | 8/2004 | Axelsson |
| 2004/0159782 | A1 | 8/2004 | Park |
| 2004/0164239 | A1 | 8/2004 | Franzen |
| 2004/0183007 | A1 | 9/2004 | Belov et al. |
| 2005/0006577 | A1 | 1/2005 | Fuhrer et al. |
| 2005/0040326 | A1 | 2/2005 | Enke |
| 2005/0103992 | A1 | 5/2005 | Yamaguchi et al. |
| 2005/0133712 | A1 | 6/2005 | Belov et al. |
| 2005/0151075 | A1 | 7/2005 | Brown et al. |
| 2005/0194528 | A1 | 9/2005 | Yamaguchi et al. |
| 2005/0242279 | A1 | 11/2005 | Verentchikov |
| 2005/0258364 | A1 | 11/2005 | Whitehouse et al. |
| 2006/0024720 | A1 | 2/2006 | McLean et al. |
| 2006/0169882 | A1 | 8/2006 | Pau et al. |
| 2006/0214100 | A1 | 9/2006 | Verentchikov et al. |
| 2006/0289746 | A1 | 12/2006 | Raznikov et al. |
| 2007/0023645 | A1 | 2/2007 | Chernushevich |
| 2007/0029473 | A1 | 2/2007 | Verentchikov |
| 2007/0176090 | A1 | 8/2007 | Verentchikov |
| 2007/0187614 | A1 | 8/2007 | Schneider et al. |
| 2007/0194223 | A1 | 8/2007 | Sato et al. |
| 2008/0049402 | A1 | 2/2008 | Han et al. |
| 2008/0121796 | A1* | 5/2008 | Green .................. H01J 43/246 250/281 |
| 2008/0197276 | A1 | 8/2008 | Nishiguchi et al. |
| 2008/0203288 | A1 | 8/2008 | Makarov et al. |
| 2008/0290269 | A1 | 11/2008 | Saito et al. |
| 2009/0090861 | A1 | 4/2009 | Willis et al. |
| 2009/0114808 | A1 | 5/2009 | Bateman et al. |
| 2009/0121130 | A1 | 5/2009 | Satoh |
| 2009/0206250 | A1 | 8/2009 | Wollnik |
| 2009/0250607 | A1 | 10/2009 | Staats et al. |
| 2009/0272890 | A1 | 11/2009 | Ogawa et al. |
| 2009/0294658 | A1 | 12/2009 | Vestal et al. |
| 2009/0314934 | A1 | 12/2009 | Brown |
| 2010/0001180 | A1 | 1/2010 | Bateman et al. |
| 2010/0044558 | A1 | 2/2010 | Sudakov |
| 2010/0072363 | A1 | 3/2010 | Giles et al. |
| 2010/0078551 | A1 | 4/2010 | Loboda |
| 2010/0096543 | A1 | 4/2010 | Kenny et al. |
| 2010/0140469 | A1 | 6/2010 | Nishiguchi |
| 2010/0193682 | A1 | 8/2010 | Golikov et al. |
| 2010/0207023 | A1 | 8/2010 | Loboda |
| 2010/0301202 | A1 | 12/2010 | Vestal |
| 2011/0133073 | A1 | 6/2011 | Sato et al. |
| 2011/0168880 | A1 | 7/2011 | Ristroph et al. |
| 2011/0180702 | A1 | 7/2011 | Flory et al. |
| 2011/0180705 | A1 | 7/2011 | Yamaguchi |
| 2011/0186729 | A1 | 8/2011 | Verentchikov et al. |
| 2012/0168618 | A1 | 7/2012 | Vestal |
| 2012/0261570 | A1 | 10/2012 | Shvartsburg et al. |
| 2012/0298853 | A1 | 11/2012 | Kurulugama |
| 2013/0048852 | A1 | 2/2013 | Verenchikov |
| 2013/0056627 | A1 | 3/2013 | Verenchikov |
| 2013/0068942 | A1 | 3/2013 | Verenchikov |
| 2013/0161506 | A1 | 6/2013 | Ugarov |
| 2013/0187044 | A1 | 7/2013 | Ding et al. |
| 2013/0240725 | A1 | 9/2013 | Makarov |
| 2013/0248702 | A1 | 9/2013 | Makarov |
| 2013/0256524 | A1 | 10/2013 | Brown et al. |
| 2013/0313424 | A1 | 11/2013 | Makarov et al. |
| 2013/0327935 | A1 | 12/2013 | Wiedenbeck |
| 2014/0054454 | A1 | 2/2014 | Hoyes et al. |

(56) References Cited

U.S. PATENT DOCUMENTS

| | | | |
|---|---|---|---|
| 2014/0054456 | A1 | 2/2014 | Kinugawa et al. |
| 2014/0084156 | A1 | 3/2014 | Ristroph et al. |
| 2014/0117226 | A1 | 5/2014 | Giannakopulos |
| 2014/0138538 | A1 | 5/2014 | Hieftje et al. |
| 2014/0183354 | A1 | 7/2014 | Moon et al. |
| 2014/0191123 | A1 | 7/2014 | Wildgoose et al. |
| 2014/0217275 | A1 | 8/2014 | Ding et al. |
| 2014/0239172 | A1 | 8/2014 | Makarov |
| 2014/0246575 | A1 | 9/2014 | Langridge et al. |
| 2014/0291503 | A1 | 10/2014 | Shchepunov et al. |
| 2014/0312221 | A1 | 10/2014 | Verenchikov et al. |
| 2014/0361162 | A1 | 12/2014 | Murray et al. |
| 2015/0028197 | A1 | 1/2015 | Grinfeld et al. |
| 2015/0028198 | A1 | 1/2015 | Grinfeld et al. |
| 2015/0034814 | A1 | 2/2015 | Brown et al. |
| 2015/0048245 | A1 | 2/2015 | Vestal et al. |
| 2015/0060656 | A1 | 3/2015 | Ugarov |
| 2015/0122986 | A1 | 5/2015 | Haase |
| 2015/0144779 | A1 | 5/2015 | Verenchikov |
| 2015/0194296 | A1 | 7/2015 | Verenchikov et al. |
| 2015/0228467 | A1 | 8/2015 | Grinfeld et al. |
| 2015/0270115 | A1 | 9/2015 | Furuhashi |
| 2015/0279650 | A1 | 10/2015 | Verenchikov |
| 2015/0294849 | A1 | 10/2015 | Makarov et al. |
| 2015/0318156 | A1 | 11/2015 | Loyd et al. |
| 2015/0364309 | A1 | 12/2015 | Welkie |
| 2015/0380206 | A1 | 12/2015 | White et al. |
| 2015/0380233 | A1 | 12/2015 | Verenchikov |
| 2016/0005587 | A1 | 1/2016 | Verenchikov |
| 2016/0035552 | A1 | 2/2016 | Verenchikov |
| 2016/0035558 | A1 | 2/2016 | Verenchikov et al. |
| 2016/0079052 | A1 | 3/2016 | Makarov et al. |
| 2016/0225598 | A1 | 8/2016 | Ristroph |
| 2016/0225602 | A1 | 8/2016 | Ristroph et al. |
| 2016/0240363 | A1 | 8/2016 | Verenchikov |
| 2017/0016863 | A1 | 1/2017 | Verenchikov |
| 2017/0025265 | A1 | 1/2017 | Verenchikov et al. |
| 2017/0032952 | A1 | 2/2017 | Verenchikov |
| 2017/0084443 | A1 | 3/2017 | Willis et al. |
| 2017/0098533 | A1 | 4/2017 | Stewart et al. |
| 2017/0168031 | A1 | 6/2017 | Verenchikov |
| 2017/0229297 | A1 | 8/2017 | Green et al. |
| 2017/0338094 | A1 | 11/2017 | Verenchikov et al. |
| 2018/0144921 | A1 | 5/2018 | Hoyes et al. |
| 2018/0315589 | A1 | 11/2018 | Oshiro |
| 2018/0330936 | A1 | 11/2018 | Hoyes et al. |
| 2018/0366312 | A1 | 12/2018 | Grinfeld et al. |
| 2018/0366313 | A1 | 12/2018 | Hoyes et al. |
| 2019/0019664 | A1 | 1/2019 | Furuhashi et al. |
| 2019/0180998 | A1 | 6/2019 | Stewart et al. |
| 2019/0206669 | A1 | 7/2019 | Verenchikov et al. |
| 2019/0237318 | A1 | 8/2019 | Brown |
| 2019/0360981 | A1 | 11/2019 | Verenchikov |
| 2020/0083034 | A1 | 3/2020 | Verenchikov et al. |
| 2020/0090919 | A1 | 3/2020 | Artaev et al. |
| 2020/0126781 | A1 | 4/2020 | Kovtoun |
| 2020/0152440 | A1 | 5/2020 | Hoyes et al. |
| 2020/0168447 | A1 | 5/2020 | Verenchikov |
| 2020/0168448 | A1 | 5/2020 | Verenchikov |
| 2020/0243322 | A1 | 7/2020 | Stewart et al. |
| 2020/0373142 | A1 | 11/2020 | Verenchikov |
| 2020/0373143 | A1 | 11/2020 | Verenchikov et al. |
| 2020/0373145 | A1 | 11/2020 | Verenchikov et al. |

FOREIGN PATENT DOCUMENTS

| | | | |
|---|---|---|---|
| CN | 101369510 | A | 2/2009 |
| CN | 101523548 | A | 9/2009 |
| CN | 102131563 | A | 7/2011 |
| CN | 201946564 | U | 8/2011 |
| CN | 102884608 | A | 1/2013 |
| CN | 103270574 | A | 8/2013 |
| CN | 104067116 | A | 9/2014 |
| CN | 104508475 | A | 4/2015 |
| CN | 105206500 | A | 12/2015 |
| CN | 106463337 | A | 2/2017 |
| CN | 107636795 | A | 1/2018 |
| CN | 107833823 | A | 3/2018 |
| CN | 107851549 | A | 3/2018 |
| CN | 108292587 | A | 7/2018 |
| DE | 4310106 | C1 | 10/1994 |
| DE | 10116536 | A1 | 10/2002 |
| DE | 112013000726 | T5 | 11/2014 |
| DE | 102015121830 | A1 | 6/2017 |
| DE | 102019129108 | A1 | 6/2020 |
| DE | 112015001542 | B4 | 7/2020 |
| EP | 0237259 | A2 | 9/1987 |
| EP | 1137044 | A2 | 9/2001 |
| EP | 1566828 | A2 | 8/2005 |
| EP | 1789987 | A1 | 5/2007 |
| EP | 1901332 | A1 | 3/2008 |
| EP | 2068346 | A2 | 6/2009 |
| EP | 1665326 | B1 | 4/2010 |
| EP | 1522087 | B1 | 3/2011 |
| EP | 2599104 | A1 | 6/2013 |
| EP | 1743354 | B1 | 8/2019 |
| EP | 3662501 | A1 | 6/2020 |
| EP | 3662502 | A1 | 6/2020 |
| EP | 3662503 | A1 | 6/2020 |
| GB | 2080021 | A | 1/1982 |
| GB | 2217907 | A | 11/1989 |
| GB | 2274197 | A | 7/1994 |
| GB | 2300296 | A | 10/1996 |
| GB | 2390935 | A | 1/2004 |
| GB | 2396742 | A | 6/2004 |
| GB | 2403063 | A | 12/2004 |
| GB | 2455977 | A | 7/2009 |
| GB | 2476964 | A | 7/2011 |
| GB | 2478300 | A | 9/2011 |
| GB | 2484361 | B | 4/2012 |
| GB | 2484429 | B | 4/2012 |
| GB | 2485825 | A | 5/2012 |
| GB | 2489094 | A | 9/2012 |
| GB | 2490571 | A | 11/2012 |
| GB | 2495127 | A | 4/2013 |
| GB | 2495221 | A | 4/2013 |
| GB | 2496991 | A | 5/2013 |
| GB | 2496994 | A | 5/2013 |
| GB | 2500743 | A | 10/2013 |
| GB | 2501332 | A | 10/2013 |
| GB | 2506362 | A | 4/2014 |
| GB | 2528875 | A | 2/2016 |
| GB | 2555609 | A | 5/2018 |
| GB | 2556451 | A | 5/2018 |
| GB | 2556830 | A | 6/2018 |
| GB | 2562990 | A | 12/2018 |
| GB | 2575157 | A | 1/2020 |
| GB | 2575339 | A | 1/2020 |
| GB | 2595530 | A | 12/2021 |
| GB | 2610692 | A | 3/2023 |
| JP | S6229049 | A | 2/1987 |
| JP | 2000036285 | A | 2/2000 |
| JP | 2000048764 | A | 2/2000 |
| JP | 2001297730 | A | 10/2001 |
| JP | 2003031178 | A | 1/2003 |
| JP | 2003502803 | A | 1/2003 |
| JP | 3571546 | B2 | 9/2004 |
| JP | 2005538346 | A | 12/2005 |
| JP | 2006049273 | A | 2/2006 |
| JP | 2007227042 | A | 9/2007 |
| JP | 2010062152 | A | 3/2010 |
| JP | 4649234 | B2 | 3/2011 |
| JP | 2011119279 | A | 6/2011 |
| JP | 4806214 | B2 | 11/2011 |
| JP | 2013528892 | A | 7/2013 |
| JP | 2013539590 | A | 10/2013 |
| JP | 5555582 | B2 | 7/2014 |
| JP | 2015506567 | B2 | 3/2015 |
| JP | 2015521349 | A | 7/2015 |
| JP | 2015185306 | A | 10/2015 |
| RU | 2564443 | C2 | 10/2015 |
| RU | 2015148627 | A | 5/2017 |
| SU | 198034 | A1 | 6/1967 |
| SU | 1681340 | A1 | 9/1991 |

(56) References Cited

FOREIGN PATENT DOCUMENTS

| | | | |
|---|---|---|---|
| SU | 1725289 | A1 | 4/1992 |
| WO | 9103071 | A1 | 3/1991 |
| WO | 1998001218 | | 1/1998 |
| WO | 1998008244 | A2 | 2/1998 |
| WO | 199939369 | A1 | 8/1999 |
| WO | 200077823 | A2 | 12/2000 |
| WO | 2005001878 | A2 | 1/2005 |
| WO | 2005043575 | A2 | 5/2005 |
| WO | 2006014984 | A1 | 2/2006 |
| WO | 2006049623 | A2 | 5/2006 |
| WO | 2006102430 | A2 | 9/2006 |
| WO | 2006103448 | A2 | 10/2006 |
| WO | 2007044696 | A1 | 4/2007 |
| WO | 2007104992 | A2 | 9/2007 |
| WO | 2007136373 | A1 | 11/2007 |
| WO | 2008046594 | A2 | 4/2008 |
| WO | 2008087389 | A2 | 7/2008 |
| WO | 2010008386 | A1 | 1/2010 |
| WO | 2010138781 | A2 | 12/2010 |
| WO | 2011086430 | A1 | 7/2011 |
| WO | 2011107836 | A1 | 9/2011 |
| WO | 2011135477 | A1 | 11/2011 |
| WO | 2012010894 | A1 | 1/2012 |
| WO | 2012013354 | A1 | 2/2012 |
| WO | 2012023031 | A2 | 2/2012 |
| WO | 2012024468 | A2 | 2/2012 |
| WO | 2012024570 | A2 | 2/2012 |
| WO | 2012116765 | A1 | 9/2012 |
| WO | 2013045428 | A1 | 4/2013 |
| WO | 2013063587 | A2 | 5/2013 |
| WO | 2013067366 | A2 | 5/2013 |
| WO | 2013093587 | A1 | 6/2013 |
| WO | 2013098612 | A1 | 7/2013 |
| WO | 2013110587 | A | 8/2013 |
| WO | 2013110588 | A2 | 8/2013 |
| WO | 2013124207 | A | 8/2013 |
| WO | 2014021960 | A1 | 2/2014 |
| WO | 2014074822 | A1 | 5/2014 |
| WO | 2014110697 | A | 7/2014 |
| WO | 2014142897 | A1 | 9/2014 |
| WO | 2014152902 | A2 | 9/2014 |
| WO | 2015142897 | A1 | 9/2015 |
| WO | 2015152968 | A1 | 10/2015 |
| WO | 2015153622 | A1 | 10/2015 |
| WO | 2015153630 | A1 | 10/2015 |
| WO | 2015153644 | A1 | 10/2015 |
| WO | 2015175988 | A1 | 11/2015 |
| WO | 2015189544 | A1 | 12/2015 |
| WO | 2016064398 | A1 | 4/2016 |
| WO | 2016174462 | A1 | 11/2016 |
| WO | 2016178029 | A1 | 11/2016 |
| WO | 2017042665 | A1 | 3/2017 |
| WO | 2017087470 | A1 | 5/2017 |
| WO | 2018073589 | A1 | 4/2018 |
| WO | 2018109920 | A1 | 6/2018 |
| WO | 2018124861 | A2 | 7/2018 |
| WO | 2018183201 | A1 | 10/2018 |
| WO | 2019030472 | A1 | 2/2019 |
| WO | 2019030474 | A1 | 2/2019 |
| WO | 2019030475 | A1 | 2/2019 |
| WO | 2019030476 | A1 | 2/2019 |
| WO | 2019030477 | A1 | 2/2019 |
| WO | 2019058226 | A1 | 3/2019 |
| WO | 2019162687 | A1 | 8/2019 |
| WO | 2019202338 | A1 | 10/2019 |
| WO | 2019229599 | A1 | 12/2019 |
| WO | 2020002940 | A1 | 1/2020 |
| WO | 2020021255 | A1 | 1/2020 |
| WO | 2020121167 | A1 | 6/2020 |
| WO | 2020121168 | A1 | 6/2020 |
| WO | 2023285791 | A1 | 1/2023 |

OTHER PUBLICATIONS

Search Report for United Kingdom Application No. GB1613988.3 dated Jan. 5, 2017, 4 pages.

Sakurai et al., "A New Multi-Passage Time-of-Flight Mass Spectrometer at JAIST", Nuclear Instruments & Methods in Physics Research, Section A, Elsevier, 427(1-2): 182-186, May 11, 1999. Abstract.

Toyoda et al., "Multi-Turn-Time-of-Flight Mass Spectometers with Electrostatic Sectors", Journal of Mass Spectrometry, 38: 1125-1142, Jan. 1, 2003.

Wouters et al., "Optical Design of the TOFI (Time-of-Flight Isochronous) Spectrometer for Mass Measurements of Exotic Nuclei", Nuclear Instruments and Methods in Physics Research, Section A, 240(1): 77-90, Oct. 1, 1985.

Stresau, D., et al.: "Ion Counting Beyond 10ghz Using a New Detector and Conventional Electronics", European Winter Conference on Plasma Spectrochemistry, Feb. 4-8, 2001, Lillehammer, Norway, Retrieved from the Internet:www.etp-ms.com/file-repository/21 [retrieved on Jul. 31, 2019].

Kaufmann, R., et al., "Sequencing of peptides in a time-of-flight mass spectrometer:evaluation of postsource decay following matrix-assisted laser desorption ionisation (MALDI)", International Journal of Mass Spectrometry and Ion Processes, Elsevier Scientific Publishing Co. Amsterdam, NL, 131:355-385, Feb. 24, 1994.

Barry Shaulis et al: "Signal linearity of an extended range pulse counting detector: Applications to accurate and precise U-Pb dating of zircon by laser ablation quadrupole ICP-MS", G3: Geochemistry, Geophysics, Geosystems, 11(11):1-12, Nov. 20, 2010.

Search Report for United Kingdom Application No. GB1708430.2 dated Nov. 28, 2017.

International Search Report and Written Opinion for International Application No. PCT/GB2018/051320 dated Aug. 1, 2018.

International Search Report and Written Opinion for International Application No. PCT/GB2019/051839 dated Sep. 18, 2019.

International Search Report and Written Opinion for International Application No. PCT/GB2019/051234 dated Jul. 29, 2019, 5 pages.

Combined Search and Examination Report for United Kingdom Application No. GB1901411.7 dated Jul. 31, 2019.

Extended European Search Report for EP Patent Application No. 16866997.6, dated Oct. 16, 2019.

Combined Search and Examination Report for GB 1906258.7, dated Oct. 25, 2019.

Combined Search and Examination Report for GB1906253.8, dated Oct. 30, 2019, 5 pages.

Search Report under Section 17(5) for GB1916445.8, dated Jun. 15, 2020.

International Search Report and Written Opinion for International application No. PCT/GB2020/050209, dated Apr. 28, 2020, 12 pages.

Author unknown, "Einzel Lens", Wikipedia [online] Nov. 2020 [retrieved on Nov. 3, 2020]. Retrieved from Intemet URL: https://en.wikipedia.org/wiki/Einzel_lens, 2 pages.

International Search Report and Written Opinion for International application No. PCT/GB2019/051235, dated Sep. 25, 2019, 22 pages.

International Search Report and Written Opinion for International application No. PCT/GB2019/051416, dated Oct. 10, 2019, 22 pages.

Search and Examination Report under Sections 17 and 18(3) for Application No. GB 1906258.7, dated Dec. 11, 2020, 7 pages.

Carey, D.C., "Why a second-order magnetic optical achromat works", Nucl. Instrum. Meth., 189(203):365-367 (1981).

Yavor, M., "Optics of Charged Particle Analyzers", Advances in Imaging and Electron Physics Book Series, vol. 57 (2009) Abstract.

Sakurai, T. et al., "Ion optics for time-of-flight mass spectrometers with multiple symmetry", Int J Mass Spectrom Ion Proc 63(2-3):273-287 (1985).

Wollnik, H., "Optics of Charged Particles", Acad. Press, Orlando, FL (1987) Abstract.

Wollnik, H., and Casares, A., "An energy-isochronous multi-pass time-of-flight mass spectrometer consisting of two coaxial electrostatic mirrors", Int J Mass Spectrom 227:217-222 (2003).

(56) References Cited

OTHER PUBLICATIONS

D'Halloran, G.J., et al., "Determination of Chemical Species Prevalent in a Plasma Jet", Bendix Corp Report ASD-TDR-62-644, U.S. Air Force (1964). Abstract.
Examination Report for United Kingdom Application No. GB1618980.5 dated Jul. 25, 2019.
International Search Report and Written Opinion for International Application No. PCT/GB2020/050471, dated May 13, 2020, 9 pages.
Search Report for GB Application No. GB1903779.5, dated Sep. 20, 2019.
Search Report for GB Application No. GB2002768.6 dated Jul. 7, 2020.
Collision Frequency, https://en.wikipedia.org/wiki/Collision_frequency accessed Aug. 17, 2021.
International Search Report and Written Opinion for International Application No. PCT/US2016/062174 dated Mar. 6, 2017, 8 pages.
IPRP PCT/US2016/062174 dated May 22, 2018, 6 pages.
Search Report for GB Application No. GB1520130.4 dated May 25, 2016.
International Search Report and Written Opinion for International Application No. PCT/US2016/062203 dated Mar. 6, 2017, 8 pages.
IPRP PCT/US2016/062203, dated May 22, 2018, 6 pages.
Search Report for GB Application No. GB1520134.6 dated May 26, 2016.
Search Report Under Section 17(5) for Application No. GB1507363.8 dated Nov. 9, 2015.
International Search Report and Written Opinion of the International Search Authority for Application No. PCT/GB2016/051238 dated Jul. 12, 2016, 16 pages.
IPRP for application PCT/GB2016/051238 dated Oct. 31, 2017, 13 pages.
International Search Report and Written Opinion for International Application No. PCT/US2016/063076 dated Mar. 30, 2017, 9 pages.
Search Report for GB Application No. 1520540.4 dated May 25, 2016.
IPRP PCT/GB17/51981 dated Jan. 8, 2019, 7 pages.
IPRP for International application No. PCT/GB2018/051206, dated Nov. 5, 2019, 7 pages.
International Search Report and Written Opinion for International Application No. PCT/GB2018/051206, dated Jul. 12, 2018, 9 pages.
Examination Report under Section 18(3) for Application No. GB1906258.7, dated May 5, 2021, 4 pages.
Author unknown, "Electrostatic lens ," Wikipedia, Mar. 31, 2017 (Mar. 31, 2017), XP055518392, Retrieved from the Internet:URL: https://en.wikipedia.org/w/index.php?title=Electrostatic_lens&oldid=773161674 [retrieved on Oct. 24, 2018].
Hussein, O.A. et al., "Study the most favorable shapes of electrostatic quadrupole doublet lenses", AIP Conference Proceedings, vol. 1815, Feb. 17, 2017 (Feb. 17, 2017), p. 110003.
International Search Report and Written Opinion for application No. PCT/GB2018/052104, dated Oct. 31, 2018, 14 pages.
International Search Report and Written Opinion for application No. PCT/GB2018/052105, dated Oct. 15, 2018, 18 pages.
International Search Report and Written Opinion for application PCT/GB2018/052100, dated Oct. 19, 2018, 19 pages.
International Search Report and Written Opinion for application PCT/GB2018/052102, dated Oct. 25, 2018, 14 pages.
International Search Report and Written Opinion for application No. PCT/GB2018/052099, dated Oct. 10, 2018, 16 pages.
International Search Report and Written Opinion for application No. PCT/GB2018/052101, dated Oct. 19, 2018, 15 pages.
Combined Search and Examination Report under Sections 17 and 18(3) for application GB1807605.9 dated Oct. 29, 2018, 5 pages.
Combined Search and Examination Report under Sections 17 and 18(3) for application GB1807626.5, dated Oct. 29, 2018, 7 pages.
Yavor, M.I., et al., "High performance gridless ion mirrors for multi-reflection time-of-flight and electrostatic trap mass analyzers", International Journal of Mass Spectrometry, vol. 426, Mar. 2018, pp. 1-11.
Search Report under Section 17(5) for application GB1707208.3, dated Oct. 12, 2017, 5 pages.
Communication Relating to the Results of the Partial International Search for International Application No. PCT/GB2019/01118, dated Jul. 19, 2019, 25 pages.
Doroshenko, V.M., and Cotter, R.J., "Ideal velocity focusing in a reflectron time-of-flight mass spectrometer", American Society for Mass Spectrometry, 10(10):992-999 (1999).
Kozlov, B. et al. "Enhanced Mass Accuracy in Multi-Reflecting TOF MS" www.waters.com/Posters, ASMS Conference (2017).
Kozlov, B. et al. "Multiplexed Operation of an Orthogonal Multi-Reflecting TOF Instrument to Increase Duty Cycle by Two Orders" ASMS Conference, San Diego, CA, Jun. 6, 2018.
Kozlov, B. et al. "High accuracy self-calibration method for high resolution mass spectra" ASMS Conference Abstract, 2019.
Kozlov, B. et al. "Fast Ion Mobility Spectrometry and High Resolution TOF MS" ASMS Conference Poster (2014).
Verenchicov., A. N. "Parallel MS-MS Analysis in a Time-Flight Tandem. Problem Statement, Method, and Instrucmental Schemes" Institute for Analytical Instrucmentation RAS, Saint-Petersburg, (2004) Abstract.
Yavor, M. I. "Planar Multireflection Time-Of-Flight Mass Analyser with Unlimited Mass Range" Institute for Analytical Instrucmentation RAS, Saint-Petersburg, (2004) Abstract.
Khasin, Y. I. et al. "Initial Experimenatl Studies of a Planar Multireflection Time-Of-Flight Mass Spectrometer" Institute tor Analytical Instrucmentation RAS, Saint-Petersburg, (2004) Abstract.
Verenchicov., A. N. et al. "Stability of Ion Motion in Periodic Electrostatic Fields" Institute for Analytical Instrucmentation RAS, Saint-Petersburg, (2004) Abstract.
Verenchicov., A. N. "The Concept of Multireflecting Mass Spectrometer for Continuous Ion Sources" Institute for Analytical Instrucmentation RAS, Saint-Petersburg, (2006) Abstract.
Verenchicov., A. N., et al. "Accurate Mass Measurements for Inerpreting Spectra of atmospheric Pressure Ionization" Institute for Analytical Instrucmentation RAS, Saint-Petersburg, (2006) Abstract.
Kozlov, B. N. et al., "Experimental Studies of Space Charge Effects in Multireflecting Time-Of-Flight Mass Spectrometes" Institute for Analytical Instrucmentation RAS, Saint-Petersburg, (2006) Abstract.
Kozlov, B. N. et al., "Multireflecting Time-Of-Flight Mass Spectrometer With an Ion Trap Source" Institute for Analytical Instrucmentation RAS, Saint-Petersburg, (2006) Abstract.
Hasin, Y. I., et al., "Planar Time-Of-Flight Multireflecting Mass Spectrometer with an Orthogonal Ion Injection Out of Continuous Ion Sources" Institute for Analytical Instrucmentation RAS, Saint-Petersburg, (2006) Abstract.
Lutvinsky Y. I. et al., "Estimation of Capacity of High Resolution Mass Spectra for Analysis of Complex Mixtures" Institute for Analytical Instrucmentation RAS, Saint-Petersburg, (2006) Abstract.
Verenchicov., A. N. et al. "Multiplexing in Multi-Reflecting TOF MS" Journal of Applied Solution Chemistry and Modeling, 6:1-22 (2017).
Supplementary Partial EP Search Report for EP Application No. 16869126.9, dated Jun. 13, 2019.
Supplementary Partial EP Search Report for EP Application No. 16866997.6, dated Jun. 7, 2019.
"Reflectron—Wikipedia", Oct. 9, 2015, Retrieved from the Internet: URL:https://en.wikipedia.org/w/index.php?t itle=Reflectron&oldid-684843442 [retrieved on May 29, 2019].
Scherer, S., et al., "A novel principle for an ion mirror design in time-of-flight mass spectrometry", International Journal of Mass Spectrometry, Elsevier Science Publishers, Amsterdam, NL, vol. 251, No. 1, Mar. 15, 2006.
Verentchikov, A., et al., "Stable ion beam transport through periodic electrostatic structures: linear and non-linear effects", Physics Procedia, 1(1):87-97, Aug. 2008.
Hoyes et al., "Electrostatic gimbal for correction of errors in Time of Flight mass spectrometers", Waters, 2013.

(56) References Cited

OTHER PUBLICATIONS

International Preliminary Report on Patentability for International Patent Application No. PCT/US2016/063076, dated May 29, 2018, 7 pages.
Guan S., et al. "Stacked-ring electrostatic ion guide" Journal of the American Society for Mass Spectrometry, Elsevier Science Inc, 7(1):101-106 (1996). Abstract.
Willis, P. et al., "Improving duty cycle in the Folded Flight Path high-resolution time-of-flight mass spectrometer", International Journal of Mass Spectrometry, vol. 459, 116467, Nov. 1, 2020.

* cited by examiner

TOF MS DETECTION SYSTEM WITH IMPROVED DYNAMIC RANGE

CROSS-REFERENCE TO RELATED APPLICATIONS

This application is a U.S. national phase filing claiming the benefit of and priority to International Patent Application No. PCT/GB2019/051416, filed on May 23, 2019, which claims priority from and the benefit of United Kingdom patent application No. 1808530.8 filed on May 24, 2018. The contents of these applications are incorporated herein by reference.

FIELD OF THE INVENTION

The invention relates to the area of time-of-flight mass spectrometers, and is particularly concerned with improved dynamic range of the detector and of the data system for time-of-flight mass spectrometers.

BACKGROUND

Time-of-flight mass spectrometers (TOF MS) are widely used in analytical chemistry. A TOF MS has an ion accelerator that pulses packets of ions into a time-of-flight region such that they separate according to mass to charge ratio as they travel therethrough. Each pulse of ions by the ion accelerator (e.g. a pulsed converter) may be known as a "shot". Compared to other types of mass spectrometer, a TOF MS provides an advanced combination of speed, resolution, and sensitivity. Lately, detectors and data systems for TOF MS became highly stressed with improved efficiency of TOF pulsed converters and with improved brightness of ion sources, delivering up to 1E+9 ion/sec ion fluxes onto TOF detectors, corresponding to high number or ions per shot per mass peak (λi), reaching up to λi=1E+5.

Conventional detectors lack orders of magnitude in dynamic range (DR) and life-time to match maximal signal intensity. Conventional TOF detectors such as chevron micro-channel plate (MCP) detectors, withstand much smaller ion fluxes of 1E+7 ion/sec before saturating. The life-time of an MCP detector, measured by output charge, is limited to less than 1 Coulomb, corresponding to less than an hour of operation at an amplification gain of 1E+6 and an ion flux of 1E+9 ion/sec. Secondary electron multipliers (SEM) are known to withstand ion fluxes up to 1E+8 ion/sec and to survive for 10 C output charge, both of which are orders of magnitude lower than desired for some applications. Best detector life-times, in the order of 30-300 C, are reached in sealed PMT (photo multiplier tubes) and PD (photo diode) detectors. To improve the life-time of the detector, U.S. Pat. Nos. 3,898,452, 6,002,122, 6,841,936 and 8,735,818 propose either active or passive circuits instantly limiting the detector amplification at signal overloads. Still, the dynamic range of all these detectors is limited at a single detector setting.

Conventional data systems also lack orders of magnitude in the dynamic range to keep up with improved signals. In the early 1990s, TOF MS operated with time-to-digital converter (TDC) data systems, limited by the number or ions per shot per mass peak λi being <1 before reaching non-recoverable spectral distortions. The availability of fast Analog-to-Digital Converters (ADCs), also referred to as transient recorders, improved the dynamic range to λi≤100. The ion counting method within ADCs improves the dynamic range of summed ADC spectra. Ion counting with ADCs is known at least since the late 1990s, as witnessed by codes and methods implemented in "Fast Flight" ADC by EG&G. The method was then reinvented in U.S. Pat. Nos. 6,737,642, 6,794,643 and 6,836,742. The detector amplification is set up so that the signal of individual ions exceeds the noise level of both the ADC and of the electronics. Then, the DR grows proportionally to the number of summed (averaged) waveforms. Still, as witnessed by parameters of commercial TOF MS, the data system DR is limited to approximately 1E+5 per second at maximal TOF repetition rates of 10-30 kHz, i.e. lacks 4 orders of magnitude for modern brightest ion sources and effective ion interfaces.

To improve the DR of the data acquisition systems, different combinations of ADC and TDC data systems were proposed in U.S. Pat. Nos. 6,627,877, 6,864,479, 6,737,642, 7,800,054, 7,126,114, 8,354,634, 8,680,481, 8,785,845, and 9,324,544. However, the solutions are primarily concerned with the preservation of higher TOF resolution by the TDC data system and the dynamic range remains theoretically limited to less than 1E+6 per second, as estimated within the referred patents.

Multiple methods were proposed to improve the DR of TOF detectors. Dual or multiple collector MCP detectors with dual channel or switching gain amplifiers were proposed in U.S. Pat. Nos. 4,691,160, 5,367,162, 5,777,326, 6,229,142, 6,646,252, 6,747,271, 6,940,066, 7,126,114, 7,423,259, 8,354,634, 8,680,481, and 9,899,201. Those methods avoid distortions for stronger signals, however, they do not protect sensitive channels and detectors against saturation (followed by the prolonged signal distortion) and against fast degradation (aging) of the detector. Besides, most of those methods are specifically designed for dual MCP detectors, limiting maximal ion signals and having short life time.

A group of alternative methods in U.S. Pat. No. 6,080,985, U.S. Ser. No. 15/434,517, EP1901332, WO2012023031, U.S. Pat. Nos. 8,093,554, 8,653,446, 8,735,818, 9,514,922, 9,899,201, and US20170229297 follow the principle of gain control in U.S. Pat. No. 5,107,109 and propose alternating the ion beam intensity between high and low gains and collecting two or more sets of spectra alternated in time. The gain alternation is either constant or is data dependent as in U.S. Pat. No. 8,735,818 and US20170229297. Those methods improve the dynamic range at chromatographic separations, where weak and strong signals do not occur simultaneously, however, the methods do not avoid detector and pre-amp saturation at strong signals, and do not save the detector from aging. Besides, manipulations with ion beam intensity produce multiple spectral distortions, e.g. mass dependent discriminations, gain factor being dependent on ion intensity and varying in time, mass shifts in TOF measurements by changing temporal space charge being balanced in the strong continuous beam, and so on.

A group of methods in U.S. Pat. Nos. 6,787,760, 7,999,223, and 9,870,903 propose mass selective removal of strong ion species either within a continuous ion beam or within the TOF analyzer. Methods are complicated and are expected to cause strong spectral distortions.

It has been recognized that sealed PMTs or photo diodes (PD) provide the longest life time (up to 300 Coulomb of the output charge Vs less than 1 C by an MCP), so they were proposed to be used within hybrid detectors, where secondary electrons from an ion-to-electron converter are directed onto a scintillator, which produces light detected by photo detectors, as described in U.S. Pat. Nos. 8,680,481, 8,975,592, 9,214,322, and WO2015153622. The life-time of SEM and PMT detectors is also addressed in U.S. Pat. Nos. 3,898,452, 6,002,122, and 6,841,936. However, solving the detector life-time problem alone does not yet provide DR improvement.

The most robust improvement of TOF MS dynamic range is proposed in U.S. Pat. No. 9,214,322 by A. Makarov. The detector is split into two amplifying stages with a delay line for electrons passed between the stages. The first stage detects strong signals and the time delay allows an active electronic circuit to react and to adjust the amplification gain in the second stage. Though the detection system is capable of detecting both strong and weak signals, the automatic and reactive gain adjustment is expected to generate spectral distortion at transition times, likely falling onto mass spectral peaks.

In spite of multiple enhancements in dynamic range and longevity of TOF detectors and data systems, the previously proposed solutions still do not cover the desired dynamic range for ion fluxes up to 1E+9 ion/s with ion packets reaching λi=1E+5 ions per pulse per mass peak. Methods of the prior art employing ion beam manipulations, or using of TOF ion selectors, or using data dependent and instant adjustments of ion detectors, are expected to produce substantial spectral distortions.

SUMMARY

From a first aspect, the present invention provides a method of time-of-flight (TOF) mass spectrometry comprising: pulsing a plurality of packets of ions into a time of flight region such that they separate according to mass to charge ratio as they travel towards an ion converter; receiving the ions from different ion packets at the ion converter over different respective time periods; converting the ions into secondary particles at the ion converter; attenuating the secondary particles that are generated during the different time periods by different respective amounts and/or rates, wherein the amount and/or rate of attenuation is maintained substantially constant during each of the time periods; and then detecting the attenuated secondary particles so as to obtain mass spectral data for the ions.

As the amount and/or rate of attenuation is maintained substantially constant over each time period (i.e. over the TOF separation period for each packet of ions), the secondary particles generated from all ion species in any given ion packet are attenuated by the same amount and/or rate. This prevents attenuation only occurring part way through a TOF spectrum, which may otherwise cause spectral distortion.

As the attenuation amount and/or rate differs for secondary particles generated by different packets of ions, the method is able to highly attenuate an intense ion signal resulting from one ion packet so as to prevent detector saturation, but attenuate a less intense ion signal from another ion packet by a lower amount and/or rate. This may improve the dynamic range of the method and may also enable the detector to perform a counting mode of the secondary particles for both the intense and less intense signals.

The attenuation may be independent of the spatial position at which ions arrive at the ion converter.

The method may comprise detecting the attenuated secondary particles so as to acquire mass spectral data over an acquisition period; wherein said acquisition period comprises a first acquisition time segment during which the secondary particles generated from a first plurality of ion packets, that are consecutively pulsed into the time of flight region, are attenuated by a first constant amount and/or rate; and wherein said acquisition period comprises a second different acquisition time segment during which the secondary particles generated from a second different plurality of ion packets, that are consecutively pulsed into the time of flight region, are attenuated by a second different constant amount and/or rate.

The step of pulsing comprises pulsing packets of ions into the time of flight region using an ion accelerator, and the ion converter receives a number of ions per pulse of the ion accelerator per mass peak λi, wherein a range of λi is received at the ion converter during each of the acquisition time segments, and wherein the first and second acquisition time segments may be selected to extend over time periods such that the ranges of λi for these time segments are different and partially overlap.

The attenuation by said first constant amount and/or rate and the attenuation by said second constant amount and/or rate may be selected such that the same number of secondary particles are onwardly transmitted for the first and second acquisition time segments.

The acquisition period may comprises a third acquisition time segment during which the secondary particles generated from a third plurality of ion packets, that are consecutively pulsed into the time of flight region, are attenuated by a third constant amount and/or rate.

Although three acquisition time segments have been described, it is contemplated that four or more such segments may be attenuated by different amounts and/or rates.

At least some of the different acquisition time segments may have different durations and hence may acquire data from different numbers of packets of ions.

For example, a time segment having a lower attenuation amount and/or rate may be longer than a time segment having a higher attenuation amount and/or rate.

The secondary particles may be constantly attenuated during the whole of at least one, or during the whole of each, of the time periods or acquisition time segments so as to attenuate the secondary particles by a constant amount in that time period or acquisition time segment.

The secondary particles may be attenuated by pulsed attenuation or gated transmission of the secondary electrodes during at least one, or during each, of the time periods or acquisition time segments so as to attenuate the secondary particles at a constant rate in that time period or acquisition time segment.

The method may comprise selecting said amount and/or rate of attenuation to apply during one or more of said time periods or acquisition time segments based on a signal from the secondary particles detected prior to that one or more time period or acquisition time segment.

For example, an (e.g. intense) ion signal may be detected in one time period and the amount and/or rate of attenuation applied during one or more subsequent ones of said time periods (occurring either during the same experimental run or a later experimental run) may be based on the ion signal that was detected. This may be used to protect the detector from overloading.

Alternatively, or additionally, the detector may be provided with either active or passive detector overload protecting circuits to prevent it from overloading.

The secondary particles may be attenuated in said attenuating step by gated transmission with a gate frequency such that the gate transitions between being open and closed, or vice versa, in a timescale that is faster than the time spacing between isotope peaks, in the same ion packet and having a 1 amu difference, being received at the ion converter.

The secondary particles may be electrons, ions or photons.

The step of attenuating the secondary particles may comprise one or more of the following: (i) deflecting or retarding the secondary particles with one or more electric or magnetic field, where the secondary particles comprise charge particles; (ii) converting the secondary particles to the same or a different type of particle with a reduced yield for that conversion; (iii) splitting the secondary particles between at least two light guides, wherein the secondary particles comprise photons.

The secondary particles may be attenuated so that they have a transmission efficiency of: (i) $\leq 10^{-2}$ during at least one of said time periods or acquisition time segments; and/or (ii) $\leq 10^{-4}$ during at least one of said time periods or acquisition time segments; and/or (iii) $\leq 10^{-6}$ during at least one of said time periods or acquisition time segments.

The transmission efficiency may be defined as the number of ions that are onwardly transmitted by the attenuator, divided by the number of ions that are received by the attenuator.

The method may comprise determining a portion of the signal for the detected secondary particles that is derived from a first plurality of packets of ions and that is not saturated; determining a portion of the signal for the detected secondary particles that is derived from a second plurality of packets of ions and that is not saturated; and combining these portions to construct time-of-flight mass spectral data.

The portions that are combined may also be selected as portions that have sufficient counting statistics.

The method may comprise detecting said secondary particles using an ADC or TDC, wherein said step of attenuating is performed such that individual ones of said secondary particles are counted throughout the different time periods or acquisition time segments using the ADC or TDC, without saturation thereof.

The step of pulsing comprises pulsing packets of ions into the time of flight region using an ion accelerator, and wherein: (i) the step of attenuation may be performed such that the number of secondary particles per pulse of the ion accelerator per mass spectral peak $\lambda e$ received by said ADC is $\leq 100$; or (ii) the number of secondary particles per pulse of the ion accelerator per mass spectral peak $\lambda e$ received by said TDC may be $\leq 1$.

The ADC or TDC may be operated with a threshold above its electronic noise.

The detector gain may be set to amplify the secondary particles above the electronic noise to allow detection of individual secondary particles.

The ion converter may convert said ions to secondary particles at an efficiency of $\leq 1$, optionally wherein the resulting secondary particle signal is not amplified downstream of the ion converter.

The step of attenuating ions may comprise progressively increasing the amount and/or rate by which the secondary particles are attenuated for subsequent ones of said time periods or acquisition time segments.

The method may comprise admitting a continuous or quasi-continuous ion beam into a pulsed ion converted (such as an orthogonal accelerator) and using the pulsed converter to pulse the packets of ions into the time of flight region.

The packets of ions may be cyclically (e.g. periodically) pulsed into the time of flight region.

The ions may be reflected in the time of flight region by at least one ion mirror before they reach the ion converter.

For example, the method may be performed using a multi-reflecting time of flight mass spectrometer (MRTOF MS) having at least two ion mirrors between which the ions are reflected multiple times as they separate according to mass to charge ratio.

The method may comprise separating a sample containing analyte to be analysed, ionising the separated sample so as to form separated ions, and then pulsing these separated ions into said time of flight region different ones of said plurality of packets of ions.

The sample may be separated by a liquid chromatography separator or any other type of separator.

The separator may separate the sample over a timescale that is relatively slow as compared to the rate at which packets of ions are pulsed into the time of flight region. This may allow different analytes in the sample to be pulsed into the time of flight region in different pulses (and optionally in different acquisition time segments).

The method may comprise deflecting, reflecting or retarding ions that have been separated in the time of flight region before they reach the ion converter such that ions that have been scattered or fragmented in the time of flight region do not impact on the ion converter and do not said generate secondary particles, whereas ions that have not been scattered or fragmented in the time of flight region impact on the ion converter and generate said secondary particles.

Such scattering or fragmentation may occur due to the ions interacting with background gas in the time of flight region, as the region is not a perfect vacuum. This may cause these ions to change the angle of trajectory and/or their energy such that when the step of deflecting, reflecting or retarding is performed they do not reach the ion converter.

The step of deflecting, reflecting or retarding may deflect ions that have not been scattered or fragmented onto the ion converter. This ensures that neutrals will not be deflected and so will not reach the ion converter.

The deflecting, reflecting or retarding of the ions may be performed by an ion filter arranged directly upstream of the ion converter.

The time per spatial aberrations of this filter may be compensated by either a gridless ion mirror in the TOF mass analyzer, or by the shape and fields of said ion converter.

The filter may be placed in close proximity to the ion converter (e.g. adjacent to it), at a distance much shorter than the ion flight path in the TOF mass analyzer.

The ion filter may comprise at least one ion optical element selected from the group of: (i) an ion deflector; (ii) a sector-field deflector; (iii) a reflecting ion mirror; and (iv) a retarding lens.

The concept of deflecting, reflecting or retarding the ions such that ions that have been scattered or fragmented in the time of flight region do not impact on the ion converter is considered novel in its own right.

Accordingly, from a second aspect, the present invention also provides a method of time-of-flight (TOF) mass spectrometry comprising: pulsing a plurality of packets of ions into a time of flight region such that they separate according to mass to charge ratio as they travel towards an ion detector; and deflecting, reflecting or retarding ions that have separated in the time of flight region before they reach the ion detector such that ions that have been scattered or fragmented in the time of flight region do not impact on the ion detector, whereas ions that have not been scattered or fragmented in the time of flight region impact on the ion detector.

The second aspect may have any of the optional features described above in relation to the first aspect of the invention.

For example, the deflecting, reflecting or retarding of the ions may be performed by an ion filter arranged directly upstream of the ion detector.

The time per spatial aberrations may be compensated by either a gridless ion mirror in the TOF mass analyzer, or by the shape and fields of said ion detector.

The filter may be placed in close proximity to the ion detector (e.g. adjacent to it), at a distance much shorter than the ion flight path in the TOF mass analyzer.

The ion filter may comprise at least one ion optical element selected from the group of: (i) an ion deflector; (ii) a sector-field deflector; (iii) a reflecting ion mirror; and (iv) a retarding lens.

It is contemplated that the amount and/or rate of attenuation need not different during the different time periods, as has been described above in relation to the first aspect of the invention.

Accordingly, from a third aspect the present invention provides a method of time-of-flight (TOF) mass spectrometry comprising: pulsing a packet of ions into a time of flight region such that they separate as they travel towards an ion converter; receiving the ions at the ion converter over a period of time; converting the ions into secondary particles at the ion converter; attenuating the secondary particles, wherein the amount and/or rate of attenuation is maintained substantially constant over said first period; and then detecting the attenuated secondary particles.

This method may have any of the features described elsewhere herein (e.g. in relation to the first aspect of the invention), except that the amount and/or rate of attenuation need not be different during the different time periods.

As the amount and/or rate of attenuation is maintained substantially constant over said first period (i.e. the TOF separation period), the secondary particles generated from all ion species in the ion packet are attenuated by the same amount and/or rate. This prevents attenuation only occurring part way through a TOF spectrum and causing spectral distortion.

The attenuation may be independent of the spatial position at which ions arrive at the ion converter.

The third aspect of the invention also provides a mass spectrometer configured to perform this method.

The first aspect of the invention also provides a time of flight mass spectrometer comprising: a pulsed ion accelerator; an ion converter for converting ions into secondary particles; a time of flight region between pulsed ion accelerator and ion converter; an attenuator for attenuating onward transmission of the secondary particles; a detector for detecting the secondary particles; and control circuitry configured to: (i) control the pulsed ion accelerator to pulse a plurality of packets of ions into the time of flight region such that ions from different ion packets are received at the ion converter over different respective time periods; (ii) operate the ion converter to convert the ions into secondary particles; (iii) control the attenuator to attenuate the secondary particles generated during the different time periods by different respective amounts and/or rates, wherein the amount and/or rate of attenuation is maintained substantially constant during each of the time periods; and (iv) operate the detector to detect the attenuated secondary particles so as to obtain mass spectral data for the ions.

The spectrometer may be configured to perform any of the methods described herein.

Although a time of flight mass spectrometer has been described, it is contemplated that any other type of mass spectrometers may be provided with the techniques described herein.

The second aspect of the invention also provides a time of flight mass spectrometer comprising: a pulsed ion accelerator; an ion detector; a time of flight region between pulsed ion accelerator and ion detector; an ion-optical element for deflecting, reflecting or retarding ions; and control circuitry configured to: (i) control the pulsed ion accelerator to pulse a plurality of packets of ions into the time of flight region such that they separate according to mass to charge ratio as they travel towards the ion detector; and (ii) operate the ion-optical element so as to deflect, reflect or retard ions upstream of the ion detector such that ions that have been scattered or fragmented in the time of flight region do not impact on the ion detector, whereas ions that have not been scattered or fragmented in the time of flight region impact on the ion detector.

Embodiments of the inventions described herein comprise a converter for converting TOF separated ions into secondary particles. At first conversion step, those secondary particles may be electrons. The converter may be assisted by a magnetic field to extract the secondary electrons sidewise. The detector life time may be extended by using a sealed photomultiplier, or pin diode, or an array of avalanche diodes detectors, which requires further conversion of electrons into photons. Thus, both types of secondary particles (electrons and photons) may be detected by a TOF detector.

Embodiments of the invention include a suppressor of secondary particles (i.e. an attenuator), characterized by a transmission efficiency factor denoted as SE throughout the entire application. Though both types of secondary particles (electrons and photons) are considered for being suppressed (attenuated), embodiments of the invention primarily describe electron suppression, since the secondary electrons may be used for all types of TOF detectors, and electron suppression alone allows reaching the desired suppression. Though electron suppressor is known, e.g. from U.S. Pat. No. 9,214,322, it was not known to provide signal suppression through the entire mass spectrum, or to provide the suppression without prior amplification, or to use extremely low transmission factors (high attenuation) of the suppressor. Embodiments of the invention propose several original electron suppressors and experimentally prove it is possible to achieve an outstandingly wide range of transmission factors in the range of $1E-5<SE<1$.

Embodiments of the invention propose a non-intuitive step of first suppressing the rate of secondary particles for the entire mass spectrum ($SE<1$), before detecting those secondary particles at normal amplification of the TOF detector. This step allows counting secondary particles passed the detector at all times, where intense ion fluxes are rarified (attenuated) to keep the electron flux at a counting range.

For clarity, the ion rate on the converter is measured in number of ions per shot per mass spectral peak and is denoted as $\lambda i$ throughout the application. As described above, a "shot" refers to a pulse of ions by the ion accelerator into the time-of-flight region. The rate of secondary particles on the detector entrance per shot per mass spectral peak is denoted as $\lambda e$. Suppressing all secondary electrons (regardless of ion m/z or their position on the converter) with a transmission factor $SE \leq 1$ being fixed for the duration of TOF spectrum allows predictable dropping of the electron rate at the detector entrance as $\Delta e=\lambda i*SE$. Embodiments of the invention propose varying the transmission factor in the range 1E-4<SE<1 to sustain λe<100 (when using ADC) for incoming ion fluxes in the range of 1E-4<λi<1E+6 or to λe<1 (when using TDC) at yet smaller SE transmission factors reduced down to 1E-6.

Now the optimal use of rarified (attenuated) and non-rarified detector signals may be somehow arranged for recovering the full spectrum in a wide dynamic range. To achieve a dramatic enhancement of the dynamic range, embodiments of the invention rely on the repetitive nature of ion signals in TOF MS systems. It is proposed to arrange the signal acquisition periodically for multiple cycles of TOF shots and to split the acquisition period into acquisition time segments. Those segments differ by transmission factor (attenuation) for secondary electrons, i.e. the SE factor is stepped between acquisition segments and stays constant within each acquisition segment. At subsequent a post-processing step, this allows extracting non-saturated detector signals from all spectra for all the ionic species at both weak and strong ionic rates, where sound, non-saturated and statistically significant signals (spectral fractions, including one or more peaks) correspond to counting of secondary particles (e.g. Δe<100). In other words, the non-saturated detection of both strong and weak ionic signals is achieved by alternating the secondary electron transmission between segments, followed by spectral post-processing.

As described below, the most sensitive acquisition segment (with the lowest suppression factor SE, i.e. the lowest attenuation) detects individual ions, and may still last for most of the acquisition period, while the acquisition of stronger signals may take a much smaller fraction of the acquisition period. This allows very moderate loss of the ultimate sensitivity of counting weak ionic signals, while still extending the dynamic range.

In addition to acquiring both weak and strong ionic signals, embodiments of the invention propose protecting the detector and data system against saturation. Optionally, the detector may have an active or passive overload protecting circuits, which allows an instant suppression of the detector amplification gain at occurrence of strong signals, as described in U.S. Pat. Nos. 3,898,452 and 6,841,936. However, the method is limited to hybrid detectors with longer life times and employing photo-detectors (PMT, PD, arrays of avalanche photodiodes), usually being more expensive and characterized by wider time spreading.

For compatibility with other, lower cost and/or faster detectors, embodiments of the invention proposes a more generic solution by arranging fast gated suppression of secondary particles, wherein gate timing is detected and processed based on prior detected signals, e.g. within previous acquisition periods or within previous acquisition segments, arranged at smaller SE factors. The proposed method wins time for signal and spectral processing by a processor (being a novel element of the novel data acquisition system), this way allowing an intelligent application of gating signals, where transient times of gating circuit would fall between mass spectral isotopes or between mass spectral peaks and would minimize the distortion of mass spectral peaks. This is drastically different from U.S. Pat. No. 9,214,322, which arranges the gates to be reactive, where a limited delay is arranged for applying gates, and the gates transition times are likely to affect mass spectral peak shapes. Embodiments of the method described herein avoid signal saturation, e.g. if arranging SE factors ascending between the acquisition segments. In this case, the first segment may be used for detecting strong signals at smaller SE, not yet saturating the detector, while subsequent segments at higher SE would be already recorded with gates applied at times of strong ionic signals. Then detector never sees strong signals.

The processor for applying gated suppression may be a computer, which is most readily available, but slows down the method since PCs do not operate in real time. For faster operation, the processor may be firmware programmed within a data system FPGA, however, the implementation depends on data system manufacturers. The invention proposes an independent processor, compatible with readily available TOF components and data systems. The processor detects strong signals within acquisition segment at lower SE and then reproduces the timing of the time selecting gates within the sensitive acquisition segment with higher SE. The processor may be implemented with an FPGA logics, accounting typical mass peak width and spacing, and also providing the gates time information to the computer for accurate reconstruction of the overall summed spectra.

The proposed method of extending the dynamic range (DR) has been tested experimentally and was proven to provide at least DR>1E+7/sec, unprecedented for TOF MS. Though the obtained digitization of the overall spectra is achieved at the effectively logarithmic vertical scale (intervals become larger at stronger signals), it does not sacrifice the crucial spectral information, such as accuracy of peak quantification, time centroid precision, isobaric separation, isotopic abundance, and mass resolution. Inventor does not see fundamentals, which would limit the dynamic range at current maximal signal intensities. Further sensitivity improvements may be matched by using larger number of acquisition segments, further increasing the dynamic range.

The techniques described herein are suitable for a singly reflecting TOF, however, they are primarily designed for multi-reflecting TOF MS, where the spectral dynamic range is much less limited by physical noise of scattered ions and by chemical in-spectra noise. To further discriminate the noise of scattered ions embodiments of the invention propose a filter for deflecting or reflecting the non-scattered ions. The filter is also an independent aspect of the invention, though assisting in improving the dynamic range in TOF MS.

According to an aspect of the invention, there is provided a method of time-of-flight (TOF) mass spectrometry comprising the following steps:

a) converting TOF separated ions into secondary particles, electrons or photons;

b) alternating in time the factor of rarifying the rate of secondary particles by equal suppression of all secondary particles regardless of ion specie, and independent on spatial position of ions at the first ion to electron conversion step, wherein the rarifying factor is kept constant at the duration of the TOF separation;

c) detecting secondary particles with a detector and counting said secondary particles by a data acquisition board, either ADC or TDC, operating with a threshold above electronic noise but detecting individual secondary particles;

d) recording at least two sets of time-of-flight spectra which differ by factors of rarifying the rate of secondary particles; and e) reconstructing time-of-flight mass spectra by extracting portions of the detector signals at both higher and lower transmission factors which satisfy both requirements—not saturating signal, and having sufficient counting statistics.

Preferably, the method may further comprise a step of applying pulsed suppression of secondary particles at times of signals saturating the detector and the data acquisition board at higher secondary particle transmission, wherein those times are determined in prior spectral measurements.

According to an aspect of the invention, there is provided a method of time-of-flight (TOF) spectrometry, comprising the following steps:

a. Within a pulsed converter, admitting a continuous or quasi-continuous ion beam and cyclically with TOF period injecting ion packets into a TOF analyzer for mass separation;

b. Converting TOF separated ion packets into secondary particles at a converter;

c. Rarifying the flow rate of said secondary particles within a suppressor at an adjustable transmission factor SE, followed by transmitting said particles to a detector;

d. Cyclically at TOF period recording signal past said detector with an analog or time-to-digital converter (ADC or TDC) data acquisition board, wherein the detector gain is set to amplify said secondary particles above the electronic noise to allow detection of individual secondary particles;

e. Summing multiple TOF spectra for acquisition period being split into at least two generally uneven acquisition segments;

f. Keeping the transmission factor SE of said suppressor being constant and calibrated within each acquisition segment, and varying said SE factor between acquisition segments to allow non saturated recording of stronger ionic signals at lower SE factor, while allowing detection of individual ions at maximal SE factor;

g. Protecting said detector from overloading within segment(s) at higher or maximal transmission factors SE by either active or passive detector overload protecting circuits, or by pulsed adjustment of the SE factor at times of strong peaks, earlier detected by the same detector within prior acquisition periods or within prior acquisition segments; and h. Reconstructing the overall spectrum after completion of said acquisition period with a spectral stitching algorithm, extracting non saturated but statistically significant spectral peaks out of full mass range mass spectra recorded within all acquisition segments.

Preferably, the method may further comprise a step of processing detector signals recorded within prior acquisition periods or within prior acquisition segments to adjust the transition timing of pulsed suppression so that they fall in time between mass spectral peaks, separated by at least 1 atomic unit.

Preferably, for the purpose of compensating the detector time spreading, the method may further comprise a step of measuring peak centroids within single transients either with TDC or with ADC, applied to spectra acquired in all segments, including segments with higher transmission factor SE, wherein the centroid information or narrower signals profiles may be used to replace profile data at step (h) for those portions of spectra where secondary particles rates per TOF pulse are measured being under 1.

Preferably, the method may further comprise a step of discriminating ions scattered or fragmented in said TOF analyzer due to ion collisions with residual gas; said discrimination step may be assisted by deflecting or reflecting or temporary retarding of non scattered and non fragmented ions in a filter in the close vicinity and in-front of said converter; and wherein time per spatial aberrations of said filter may be compensated by either a gridless ion mirror in said TOF analyzer, or by shape and fields of said converter.

Preferably, said transmission factors SE may differ between said acquisition segments by constant multiplication factor of 8 to 100 to allow overlapping between segments of non saturated and statistically significant signals for multiple spectral peaks.

Preferably, said transmission factors SE may be arranged ascending between acquisition segments for earlier detection of strong ionic signals in prior acquisition segments and for preventing the detector saturation with said pulsed suppression at sequentially following acquisition segments arranged with higher transmission factor SE.

Preferably, said secondary particles may be electrons or photons, and wherein said steps of constant or pulsed suppression may comprise one step of the group: (i) deflection or retarding of secondary electrons with electric fields; (ii) a single or multi-stage secondary electron to electron emission at reduced yields, adjusted from nearly unity to much lower than unity; (iii) photon splitting between at least two channels of light guides; (iv) pulsed suppression by photo cells; and (v) a multi-cascade combination of the above suppression steps to reach lowest transmission factors down to SE=1E-6.

According to an aspect of the invention, there is provided a time-of-flight (TOF) spectrometer, comprising:

a. Conventional components of TOF spectrometer: a continuous or quasi-continuous ion source; a pulsed converter for cyclic ejection of ion packets at TOF period, such as an orthogonal accelerator, or an radio-frequency RF ion trap, or a DC trapping ion trap; a TOF analyzer for mass separation of said ion packets; a detector; and a data acquisition board—either an analog or time-to-digital converter (ADC or TDC) data acquisition board;

b. Past said TOF analyzer, a secondary particle converter for converting ion packets into packets of secondary particles;

c. Past said converter, a suppressor for rarifying the flow rate of said secondary particles at an adjustable transmission factor SE, variable at least in the range between 1E-4 to 1 and kept constant during TOF separation cycle;

d. Past said suppressor, a detector of said secondary particles (electrons or photons), wherein the detector gain is adjusted to record single secondary particle above a threshold exceeding the electronic noise of said acquisition board;

e. At least one processor within a computer, or processing board, or within fast programmable gate array (FPGA) of said data acquisition board; said at least one processor executes the predetermined sequence of spectral summation with acquisition period being split between at least two acquisition segments; said at least one processor is further arranged to adjust said transmission factor SE between acquisition segments; said at least one processor recovers overall mass spectra in wider dynamic range with an algorithm of spectral stitching, extracting non saturated but statistically significant spectral peaks out of full mass range mass spectra recorded within all acquisition segments;

f. Wherein the detector is protected from saturation within segment(s) at higher or maximal transmission factors SE by either active or passive detector overload protecting circuits, or the spectrometer further comprises a pulsed generator for a pulsed adjustment of the SE factor at times of strong peaks prior detected by the same detector within prior acquisition periods or within prior acquisition segments Preferably, said processor may be further arranged to process the detector signals, recorded within prior acquisition periods or within prior acquisition segments, to adjust the transition timing of said pulsed generator so that they fall in time between mass spectral peaks, separated by 1 atomic unit.

Preferably, the spectrometer may further comprise at least one ion optical element arranged for deflecting or reflecting or temporary retarding of ions in the close vicinity and in-front of said converter to discriminate against ions scattered or fragmented in said TOF analyzer due to ion collisions with residual gas.

Preferably, said secondary particles may be electrons or photons, and wherein said constant or pulsed suppressor may comprise one of the group: (i) deflector or reflector of secondary electrons with electric fields; (ii) at least one dynode for secondary electron to electron emission at reduced yields ≤1; (iii) photon splitter between at least two channels of light guides; (iv) pulsed suppressing photo cell; and (v) a multi-cascade combination of the above suppressors for reaching lowest transmission factors down to SE=1E-6.

According to an aspect of the invention, there is provided a filter of ions scattered or fragmented in a TOF analyzer due to ion collisions with residual gas, positioned in-front of an ion detector or converter, wherein said filter is placed in a close vicinity of said detector at distances being much shorter than the ion flight path in said TOF analyzer, and wherein said filter comprises at least one ion optical element for separating collided and non collided ions. Preferably, said ion optical element may comprise at least one of the group: (i) deflector; (ii) sector-field deflector; (iii) a reflecting ion mirror; and (iv) a temporary retarding lens.

Preferably, said ion optical elements may be paired for reducing time-per-spatial aberrations of said ion optical elements, and/or the residual aberrations are compensated by either a gridless ion mirror in said TOF analyzer, or by shape and fields of said converter.

According to an aspect of the invention, there is provided a circuitry with digital processing for external loop of pulsed suppression of strong signals on TOF detector arranged for recording prior occurred strong signals and for reproducing digitally corrected suppressing gates at later time of signal recording.

BRIEF DESCRIPTION OF THE DRAWINGS

Various embodiments will now be described, by way of example only, and with reference to the accompanying drawings in which.

DETAILED DESCRIPTION

Figure 1:
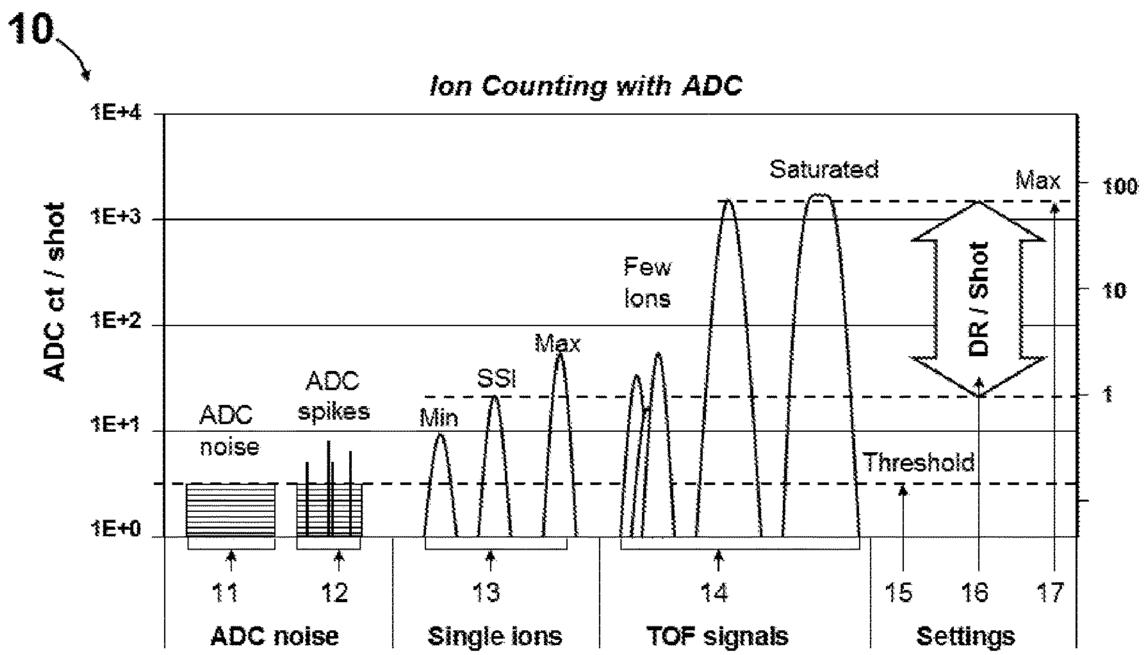
Fig. 1 Prior Art
FIG. 1 shows a prior art setting of ADC data systems for ion counting, improving dynamic ranges compared to purely analog methods at prolonged spectral summations; the setting is characterized by using ion rates λi<100 and by applying a signal threshold.

Referring to FIG. 1, the prior art method of ion counting with an ADC, also referred to as digital analog mode of TOF data acquisition, is schematically depicted by diagram 10 with a logarithmic vertical scale for ADC vertical counts per second (ct/s), so as for number of ions per shot per mass specie (denoted as λi in this application).

Commercially available ADCs with a 12-bit vertical scale, operating at few giga-samples a second (GSs) sampling rate produce their own digital noise of a few least significant bits, presented here by the noise level 11. The average noise level depends on the quality of a particular board and on the signal line wiring, and usually is in the level of 3 to 5 ct. The average level of noise includes most (say, 70%) of the noise energy with a few sharp spikes 12 above the average noise level. Adjustments of the preamplifier gain allow keeping the preamplifier and electronics noise to be comparable or lower than the average ADC noise 11. Sharp spikes 12 last for 1 or 2 sampling channels, they are notably narrower than single ion signals 13, and they can be removed by the single waveform on a fly processing.

The detector amplification gain is set sufficiently high to keep the average single ion signal, denoted as SSI, way above the average noise level 11 (approximately 5-10 times higher), accounting wide intensity distributions of single ion signals 13, corresponding to approximately 10-fold span between minimal and maximal signals of individual ions. The graph 10 depicts setting for SSI=20 ct.

Setting the acquisition threshold 15 equal to or slightly higher than the average noise level 11 and filtering out sharp spikes 12 allow recording signals of individual ions practically free of ADC and electronic noise. The signal under the threshold is discarded. With long spectral summations (say, for 0.1 to 1 second at a typical 10 kHz pulsing rate), signals of individual ions add up, forming shapes of mass peaks without adding up the electronic and ADC noise. Then the noise in the summed spectra is formed by scattered individual ions only, rather than by ADC and electronic noise. The signal to residual electronic noise ratio grows proportionally to the number of summed waveforms, which allows reliable detection of weak mass spectral peaks at λi=3E-4 to 1E-4 at a 1 second summation. Mass spectral peaks formed by few detected ions may be well seen (until being limited by noise of scattered ions), which allows a dramatic improvement in the detection of weak signals, in drastic difference compared to a purely analog mode, where electronic noise is not discarded and its level grows as the square root of number of summed waveforms.

In addition to counting and summing of individual ions (which could be handled by TDC data systems as well), the method also allows recording transients of yet larger ionic signals, composed of few ions (λi~1) up to a hundred ions per shot per peak ($\lambda_i \leq 100$), before saturating the ADC level, usually being 2000 ct vertical scale for a 12-bit ADC (being effective 11-bit accounting dual polarity of the vertical scale). Usually mass spectral peaks are wider in time than single ion signals, which is expected to increase the maximal λi, fitting into a non-saturated mass peak, however, because of temporal intensity variations and because of limited linear range of detector and amplifier, the maximal λi is usually limited to approximately λi=100, before affecting peak shapes, resolution, and mass accuracy.

The resultant dynamic range per shot of the method shown in diagram 10 is limited to approximately DR/shot=100. However, due to noise-free signal summation, the data acquisition dynamic range per 1 second grows proportionally to number of summed waveforms and reaches approximately DR=3E+5/sec, covering a range of ion rates from λi=3E-4 to λi=100.

For comparison, if using similar settings, but not removing noise under the threshold, in a purely analog acquisition mode the dynamic range per second would be limited to DR<1E+4/sec at most, accounting summation of the average noise and spikes, growing as square root of waveform number. Accounting minimal signal to noise ratio being 3, the minimal detectable λi becomes 1E-2, i.e. sensitivity is lower by factor of 30.

Now, with understanding of the counting ADC method, it becomes apparent that high dynamic range of the counting ADC method is lost in those prior art methods which utilize adjustments of the detector gain and then miss single ions at reduced gains.

Embodiments of the present invention retain the counting acquisition method with ADC, even when detecting strong ion signals, which is achieved by rarifying (attenuating) the flux of secondary particles in front of the detector, as will be described below.

Figure 2:
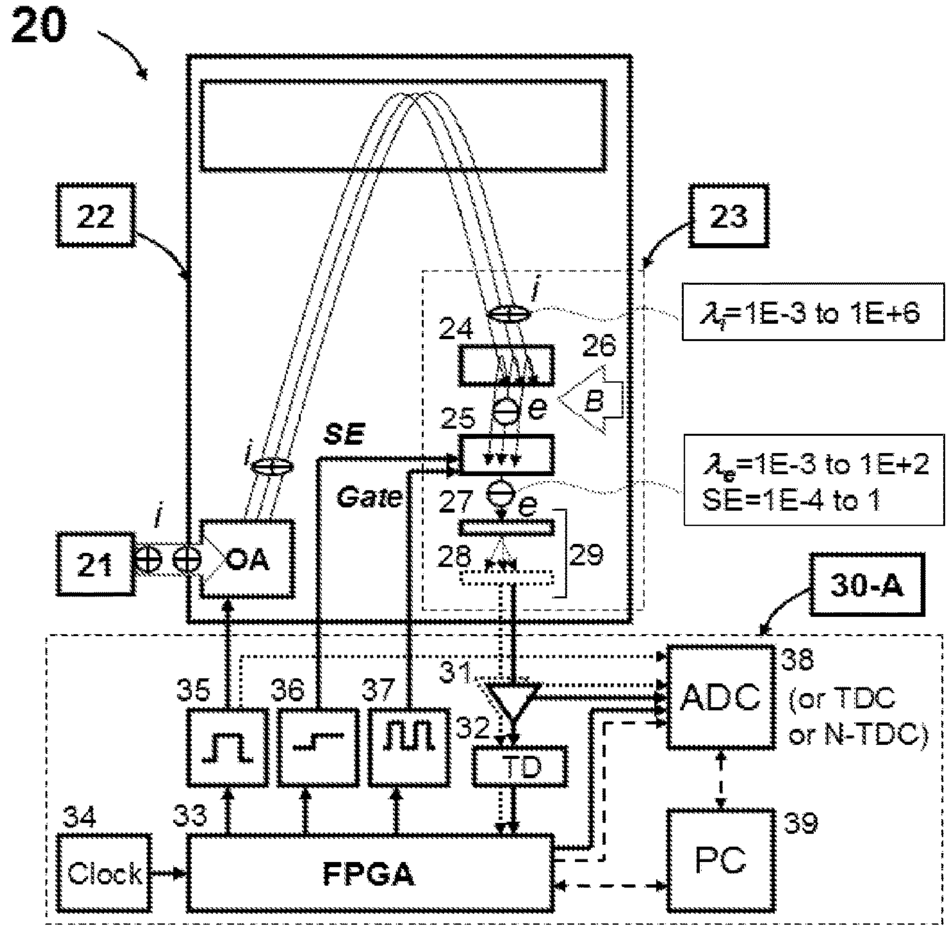
FIG. 2 shows an embodiment of the detector and an exemplary data system of an embodiment of the present invention, comprising an ion to electron converter, a secondary electron suppressor and a processor for alternating secondary electron transmission SE of the suppressor.

Referring to FIG. 2, an embodiment of a Time-of-flight mass spectrometer (TOF MS) of the present invention is shown comprising: a continuous or quasi-continuous ion source 21; an exemplary TOF analyzer 22 with an orthogonal accelerator OA; a detector 23; and an exemplary data acquisition system 30-A.

The invention relies on the repetitive nature of TOF MS signals, varying much slower than cycles of OA accelerator (usually 50-100 us) and slower than data acquisition periods in novel method (usually 0.1-1 s, as described below). The continuous ion source 21 may comprise an intrinsically continuous ion source, like ESI, APPI, APCI, EI, ICP, or gaseous MALDI ion source, while using either sample infusion or injection, or while using relatively slow chromatographic separations like GC or LC. Yet faster time variations may be needed and may be handled by TOF MS 20 in cases when source 21 further comprises ionic separators, like a quadrupole MS or an ion mobility (IMS) separator, with or without a fragmentation cell for MS-MS tandems.

TOF MS analyzer 22 is shown as singly reflecting TOF mass analyser, though it may be of other types, like a multi-reflecting TOF (MRTOF) mass analyser (comprising at least two ion mirrors between which ions are reflected multiple times) or a multi-turn TOF (MT-TOF) mass analyser (comprising electric sectors for turning the ions multiple times). The TOF pulsed converter, shown here as an orthogonal accelerator (OA), may be replaced by other devices for pulsing ions into the TOF region, such as a trapping pulsed converter (like RF or DC traps with axial or radial ejection), or may be a combination of the OA with ion trapping and pulsed release in an upfront radio-frequency ion guide for improved duty cycle of the pulsed conversion.

Again referring to FIG. 2, detector 23 may comprise: an ion to electron converter 24 (optionally assisted by a magnetic field B for isochronous transfer of secondary electrons e, although it may use a Venetian blind converter or alike without a magnetic field); a fast-controlled suppressor of the secondary electrons 25; and a detector 29 of secondary particles. Detector 29 may be any known TOF detector, like a pair of MCPs, or an SEM. Optionally, for a longer life-time, detector 29 may comprise a scintillator 27 followed by a photo-detector 28, such as a photo-electron multiplier tube (PMT), or a pin diode (PD), or an array of avalanche photo diodes. The detector 29 may have active or passive circuitry for rapid and reactive suppression of the detector amplification gain at times of strong signals, similar to those described in U.S. Pat. Nos. 3,898,452, 6,002,122, 6,841,936 and 8,735,818. The detector may employ known means for extending the TOF dynamic range, e.g. comprising: two collectors or an intermediate dynode to output two signals at different amplification; two amplifiers channels or two amplification channels for the same signal from detector; multiple equal sensitivity channels; etc.

The detection system comprises a secondary electron suppressor 25 which may rarify the secondary electrons for the whole mass spectrum and may vary the electron transmission efficiency factor SE over a wide range, e.g. at least between 1E-4 to 1. Analog adjustment of the SE factor may be controlled by power supply 36, which could be switched relatively slowly compared to the spectral time (e.g. 100 us). Similarly, a suppressor may be used for suppressing photons downstream of scintillator 27, provided by photovoltaic devices.

The same suppressor(s), or similar and additional suppressor(s), may be used for fast gating of the secondary electrons at times of strong ionic peaks, as will be described in more detail below. Pulsed gates are formed within pulse generator 37, which may be operated with much faster transient times, e.g. being at least shorter than the time spacing between isotope peaks with 1 amu difference, estimated as 50 ns for TOF MS and as 500 ns for multi-reflecting TOF MS (MR-TOF MS).

Contrary to prior art methods based on manipulations of the ion beam or ion packets, exemplified by U.S. Pat. No. 6,080,985, U.S. Ser. No. 15/434,517, EP1901332, WO2012023031, U.S. Pat. Nos. 8,093,554, 8,653,446, 8,735,818, 9,514,922, and 9,899,201, and contrary to the mass selective ion filtering in U.S. Pat. Nos. 6,787,760, 7,999,223, and 9,870,903, suppressing secondary electrons with suppressor 25 provides multiple advantages such as: not distorting spectral composition; not distorting space charge and surface charge balances within the ion beam path; providing mass independent suppression factors; providing quantitatively controlled and stable suppression factors which could be adjusted in much wider range; not shifting mass peaks in flight time, or at least providing a well calibrated time shifts, and adding a meniscus time spread because of electrons' high velocities and their isochronicity in magnetic fields.

Referring again to FIG. 2, an exemplary embodiment of a data acquisition system 30-A is shown comprising: a preamplifier 31, optionally including a second line amplifier (shown by a fine dashed line) of the same signal at different gain, or amplifying a second signal from detector 29 (say, from an intermediate dynode or from a second collector); a threshold discriminator TD 32 for detecting signals over the preset threshold, optionally being a constant fraction discriminator (CFD); a processor 33, optionally being a fast on-line processor implemented on a fast programmable gate array (FPGA); a synchronizing clock 34; a pulse generator 35 for triggering OA pulses, in turn triggering acquisition cycles of ADC 38; a fast adjustable power supply 36 for regulating slower switching of transmission factor SE of the suppressor 25; an ultra-fast and moderate voltage pulsed generator 37 for gated additional suppression of strong signals; a signal acquisition card 38, preferably being fast and at least 12-bit ADC; and a PC 39. Alternatively, if using multiple outputs from detector 29 and multiple preamplifiers 31, signal acquisition card 38 may by a lower bit ADC (for cost saving), or a single channel TDC (for improving resolution), or a multi-channel TDC-N-TDC (for improving resolution and retaining high dynamic range per acquisition segment).

Arrows show connections between components, where solid arrows may represent lines for analog signals and pulses, fine dashed arrows may represent duplicating or alternative channels, and dashed arrows may represent digital information lines.

The components of the data acquisition system 30-A have the following major functions: clock 34 provides a reference frequency for timing of the FPGA 33 and generators 35-37; amplifier(s) 31 split signal(s) between the ADC 38 and discriminator 32; discriminator 32 is used to detect strong ion signals over a preset threshold; FPGA 33 may be a real-time processor for defining further described time segments and data acquisition period, for measuring timing of strong signals from TD 32, for synchronizing pulses of generator 35, for adjusting the SE factor with slow generator 36, and for determining times for gate pulses from the generator 37. Optionally, for operation in real time, the FPGA 33 is firmware programmed, where parameters or particular versions of FPGA program may be loaded from PC 39. FPGA 33 may provide the information on used parameters and pulse timings back to PC 39 for spectral post-processing. FPGA 33 may generate synchronizing start pulses to ADC 38. Alternatively, actually occurred pulses of generator 35 may trigger acquisition cycles of ADC 38. FPGA 33 may also provide to ADC 38 the information on the number of waveforms for summing spectra per time acquisition segments (described below). PC 39 may be used for loading programs and parameters onto ADC 38 and FPGA 33, for receiving summed spectra from ADC 38 and for spectral post-processing. Full operation of the data acquisition system may be understood later, accounting the below explanations on timing and amplitude settings in FIG. 4 and FIG. 5.

Figure 3:
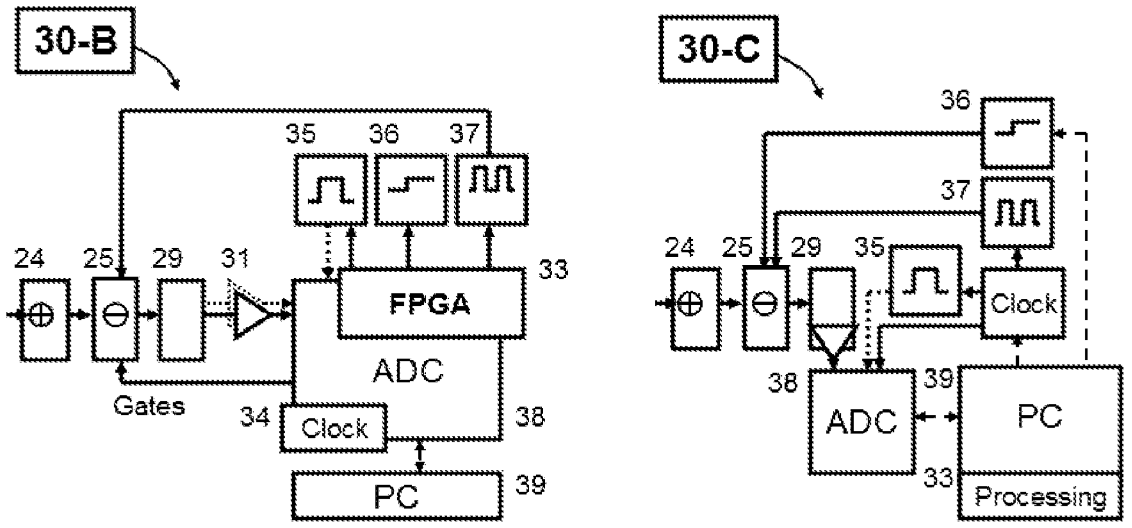
FIG. 3 shows alternative embodiments for the processor, arranged within a PC or a firmware programmed FPGA of the ADC.

Referring to FIG. 3, alternative embodiments (also serving as non-limiting examples) 30-B and 30-C illustrate that the data acquisition functions may be moved between components. In embodiment 30-B, clock 34 and PFGA 33 may be incorporated into ADC (or TDC, or N channel TDC) 38, having those circuitry already, though, if using a commercially available ADC, the firmware programming becomes dependent on ADC manufacturers. For this reason, the embodiment 30-A is preferred for implementation of the method with an existing commercial ADC. Alternatively, embodiment 30-C may use PC 39 for pulse timing processing 33 and for adjustments of slow varying voltages 36, while using external clock 34 for controlling pulse signals of generators 35 and 37. This alternative is expected to operate at slower time scales, accounting that normal PCs do not operate in real time, but may be readily implemented with other commercial components.

The method of data acquisition will now be described with reference to the schematics of detector 23 and data system 30A in FIG. 2, to the time diagram 40 in FIG. 4 and to the signal ranges diagram 50 in FIG. 5A.

The method may comprise the following steps: a) arranging periodic signal acquisition with the acquisition period being split into acquisition segments; b) varying the electron transmission SE between segments (optionally ascending values) and counting secondary electrons with the ADC data system set up in analog counting mode; c) summing spectra per segment; d) reconstructing spectra while taking non-saturated and statistically sound signals from all acquired spectra. The method may be further enhanced by using overload protection at the detector and/or by gating intense signals, where gating times may be determined from the prior acquired signal taken from the same detector signal. A filter may be used to suppress ions scattered in the TOF analyzer. The steps are detailed below.

Figure 4:
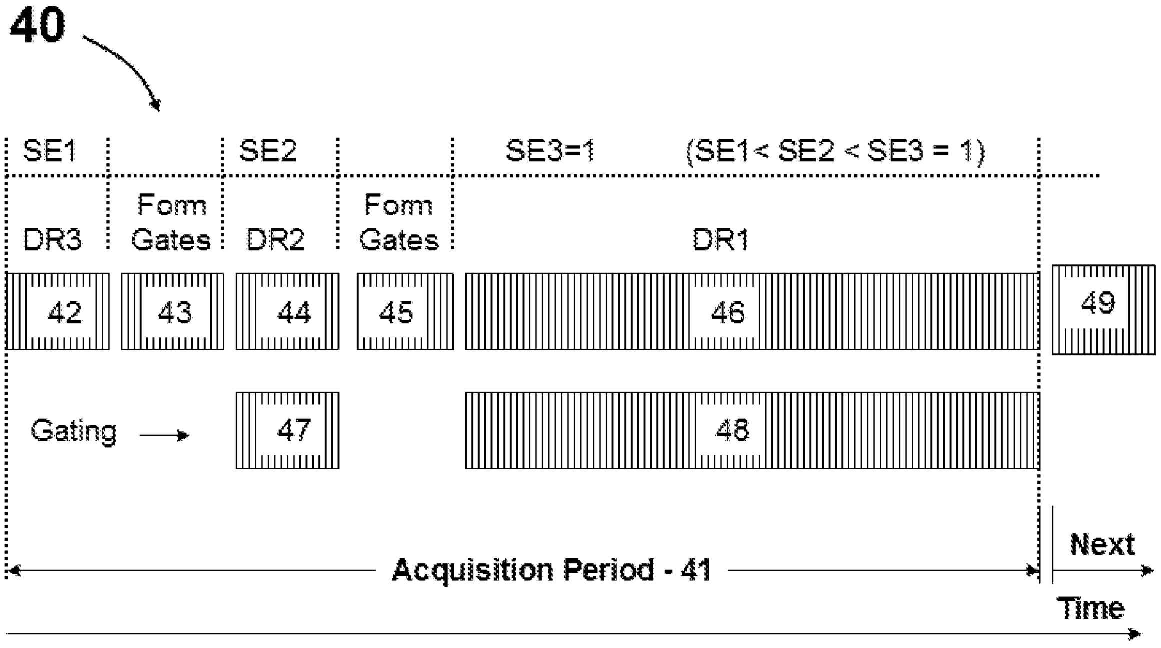
FIG. 4 shows the timing diagram for the data acquisition method of an embodiment of the present invention, where the electron transmission factor SE is ascending between acquisition segments for detecting ionic signals in a wide dynamic range, for detecting strong signals, and for processing time gates of SE suppression at times of strong signals.

Referring to FIG. 4, the acquisitions may be obtained periodically, where the whole acquisition period 41 (e.g. expected in the range from 0.1 to 1 sec) is split into time segments 42 to 46. Referring to FIG. 5A, those time segments 42-46 are also shown and linked to different coefficients SE of secondary electron transmission in the suppressor 25, for covering different dynamic ranges of mass peak intensities, denoted as DR3, DR2 and DR1. Sequential spectral acquisition at different ranges of signal intensities becomes possible due to the repetitive nature of the ionic signal occurring in TOF MS systems (e.g. with intrinsically continuous ion sources and fast repetition rates of the TOF MS, e.g. 10 KHz or faster), being much faster than the upfront chromatographic time scales and being faster or comparable to the mass spectral (and/or or ion mobility separation) time scale.

Time diagram 40 in FIG. 4 illustrates that segment 46 (having a low SE of 1) may occupy most of the acquisition cycle 41, this way increasing the time portion used for detecting individual ions. The diagram 40 also shows optional intermediate segments 43 and 45 which may be used to process information on the prior occurrence of strong signals for use in applying time gates, shown by segments 47 and 48, which are time-aligned with segments 44 and 46 correspondingly.

Figure 5A:
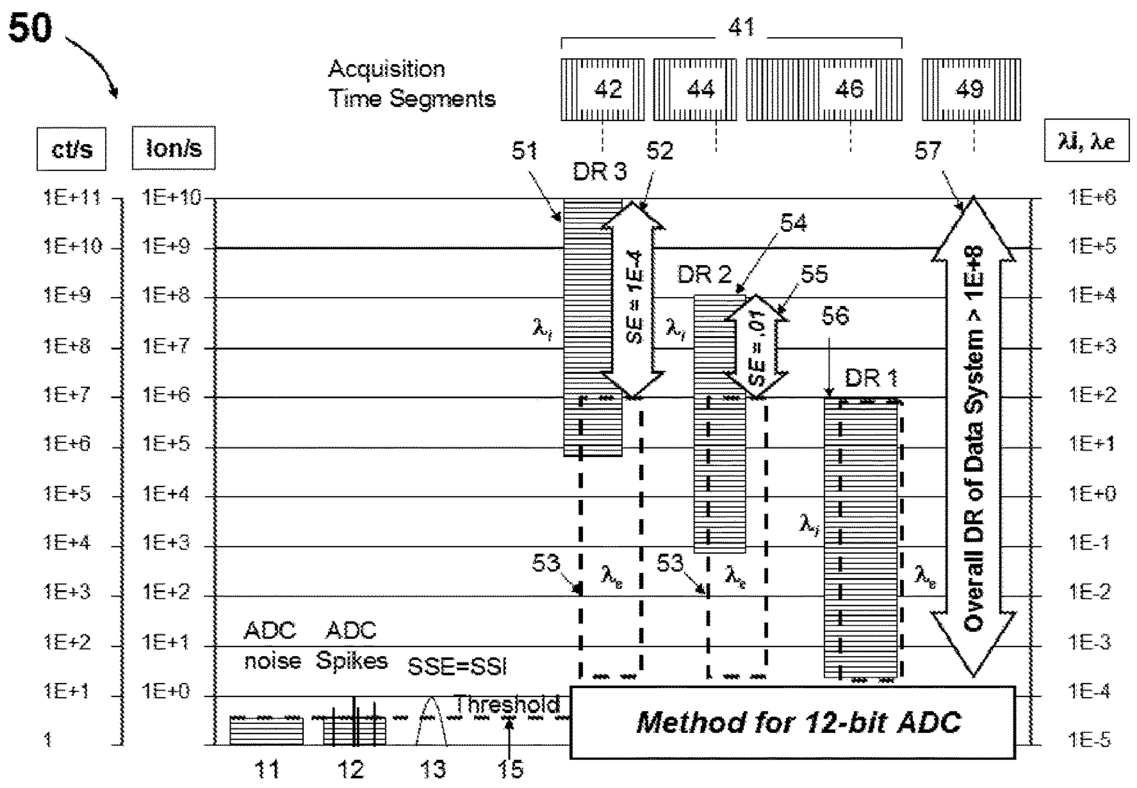
FIG. 5A shows the signal ranges diagram in logarithmic scale and in-segment relations between ionic rates λi, suppression factors SE, and secondary electron rates Δe.

Referring to FIG. 5A, the dynamic range diagram 50 presents signals and dynamic ranges per acquisition segment 42, 44 and 46 of FIG. 4. The diagram 50 aligns several logarithmic vertical scales for the number of ADC counts per second (ct/s), for the number of ions per second, for the number of ions λi per shot per peak, and for the number of secondary electrons per shot per peak. The alignment of the scales assumes a 10 kHz pulsing rate of the OA and assumes the data system being set up for the ion counting method of FIG. 1. The average ADC noise 11 about matches or exceeds the electronics noise and is limited to a few ADC ct (3-5), thus, defining the acquisition threshold level 15. High frequency ADC spikes 12 of amplitude 3-10 ct may remain above the threshold 15, if they are removed at waveform processing. The average ion signal 13, denoted as SSI is set well above the threshold 15, here shown being set at 10 ct height for clarity (SSI=20 to 30 ct is more realistic for fast ADCs). Since the detector 23 employs ion-to-electron converter 24, the single ion signal SSI 13 may effectively be the signal of a single secondary electron: SSI=SSE.

FIG. 5A illustrates the adjustment between acquisition segments 42,44,46 of the transmission factor SE for the secondary electrons (occurring within suppressor 25 and controlled by supply 36), where the numerical example of FIG. 5A shows SE=1E-4 for segment 42; SE=1E-2 for segment 44 and SE=1 for segment 46. This allows detecting strong ionic signals with parameters λi (number of ions per shot per mass peak) up to 1E+6, by rarifying the flux of the secondary electrons to a level of λe<100, so that the secondary electrons can be counted with the ADC. The electron suppression factor SE then defines the dynamic range (DR) for the ionic signals, which may be detected by electron counting without detector saturation, where DR3 corresponds to 10<λi<1E+6, DR2 corresponds to 1E-1<λi<1E+4; and DR1 corresponds to 1E-3<λi<1E+2. Optionally, as shown in FIG. 5A, the dynamic ranges for the ionic signals are shifted with partial overlaps between them for a more accurate reconstruction of the overall spectra from spectra acquired in all segments to discard spectral peaks with a small number of counted electrons.

To prevent the saturation of detector 29, of amplifier 31 and of ADC 38 by signals of strongest ionic species within segments 44 and 46 at higher electron transmissions SE, the detector may employ active or passive circuitry for instant suppression of the detector amplifying gain. In another method, which is detailed below, time gates are applied within the electron suppressor 25 (or alike), where timing of the gates is determined within the previous data acquisition period, or within the previous data acquisition segment.

Another improvement is related to use of capacitive coupling anywhere in the signal line from a generally floated detector to a signal amplifier and to the data acquisition board. To prevent temporal sagging and curvature of the signal baseline, all of those capacitive couplings may be arranged with a RC constant being much higher than the ion flight time, so as to keep the base line straight during the TOF spectrum and in particular to prevent baseline curvature passed strong and saturating signals. A slow shift of the signal base line at times of multiple TOF shots may be then compensated by either active base compensation circuit or by processing algorithms within or past data acquisition board.

Referring again to FIG. 4 and FIG. 5, multiple acquisition segments 42-46 are used to acquire spectra at different suppression factors SE, thus, covering different ranges of ion rates λi, while keeping the ADC able to count secondary electrons.

The first acquisition time segment 42 may be used for acquiring detector 29 signals at DR3 dynamic range using the lowest electron transmission SE=1E-4 in suppressor 25. The transmission factor SE may be preset before the experimental run for generating repetitive and reproducible spectral files between experimental runs. Alternatively, the SE factor may be intelligently adjusted, based on signal intensities detected within segment 42 or within the (or a) previous acquisition period.

Strong ion signals with ion rates in the range 1E+1<λi<1E+6 produce the same strong rate of electron signals from the ion-to-electron converter 24. By setting suppression factor to be low (SE=1E-4), the electron rate at the entrance of detector 29 is rarified to 1E-3<λe<100. Then detector 29 and amplifier(s) 31 are not saturated and the ADC 38 operates in the analog counting mode, as described in relation to FIG. 1. After waveform summation, strong ion signals will produce sound peaks, while weaker ionic signals may produce random single counts. Those single counts of weak signals may be filtered out later at the spectral processing step.

Within segment 42, the signal from amplifier(s) 31 is split between ADC 38 and threshold discriminator 32 to detect the presence of strong electron signals above a preset threshold. If such strong signals above the threshold are detected then the suppressor 25 may be controlled to reduce the SE value and/or apply gate pulses 47. The next (optional) segment 43 may be used to determine the optimal timing of such gate 47 pulses in segment 44, if these gate pulses 47 are to be applied. This option may be used if applying fast gates 47 to suppress secondary electrons, produced by intense mass peaks within the acquisition segment 44. The gate pulses 47 may gate the passage of the secondary electrons to the detector 29, i.e. the gate pulses 47 may intermittently block the passage of the electrons to the detector 29. The exact timings for suppressing pulses 37 may be calculated in FPGA 33, in a PC 39, or within an FPGA of the ADC 38, as described in FIGS. 2 and 3. Optionally, such processing shall account for mass peak time width and for time spacing between isotopes, so that the transients of the gate 37 switching would be timed at the spacing between isotopes with 1 amu mass difference.

The above described intelligent gating with the gate timing calculated based on the overall spectrum is far superior to the reactive gating, proposed in U.S. Pat. No. 9,214,322. Setting transient times distant from isotope peaks avoids distortions isotope peaks and of surrounding and mass resolved isobar peaks.

The following time segment 44 with dynamic range DR2 may be used to acquire spectra at a lower SE than during segment 42, such as SE=1E-2. This may allow non-saturated recording of intermediate intensity ionic signals such as at 1E-1<λi<1E+4 rates, which may be converted to 1E-3<Δe<100 electron rates by converter 24. As described above, optionally, time gates 47 are applied at times of arrival of strong ion signals, which may have previously been detected within a preceding time segment 42 and processed within time segment 43, to sustain a suitable electron rate (e.g. λe<100) throughout the entire waveform (full mass range) by excluding or pulsed deeming the excessive signals at the suppressor 25. Segment 44 may be used for detecting peaks of the intermediate intensity which are expected to saturate in the next segment 46. The following (optional) segment 45 may then be used to process the exact timings of time gates 48 to be generated by generator 37, and applied within the segment 46. This may be particularly beneficial in if the detector 29 does not have circuits for instant gain suppression at excessively large electron signals. The number of electron suppressing time gates 48 may be greater than number of time gates 47.

Embodiments therefore propose a stepped ascending of SE factors between acquisition segments, in this way producing non-saturating signals in the first segment 42, and the pulsed suppressing of excessively strong signals in subsequent segments 44 and 46.

Time segment 46 may set SE≅1 for acquiring signals of the least intense ionic species at smallest ion rates, e.g. in the range 1E-3<λi<100, matching 1E-3<λe<100 electron rates.

In spite of the wide dynamic range of ionic signal intensities, e.g. ranging from 1E-3<λi<1E+6, any mass peak may be recorded with ion counting at relatively low electron rates Δe (e.g. 1E-3<Δe<100) in at least one acquisition segment, in which the coefficient SE of electron transmission may be optimized for this mass peak. This allows extracting (at a later post-processing step) mass spectral peaks at sufficient signal statistics and without data system saturation. For those extracted spectral fractions (single mass peak or a group of mass peaks), the data system components (ion detector 29, preamplifier 31, and ADC 38) operate to count secondary electrons, while being prevented from saturation at other spectral fractions either by the pulsed suppressor 37 of secondary electrons or by active or passive circuitry within the detector 29 instantly suppressing the detector amplification gain.

The overall spectrum with improved overall dynamic range may be then reconstructed anytime after completion of the single acquisition period 41, e.g. during the next acquisition period 49.

Figure 5B:
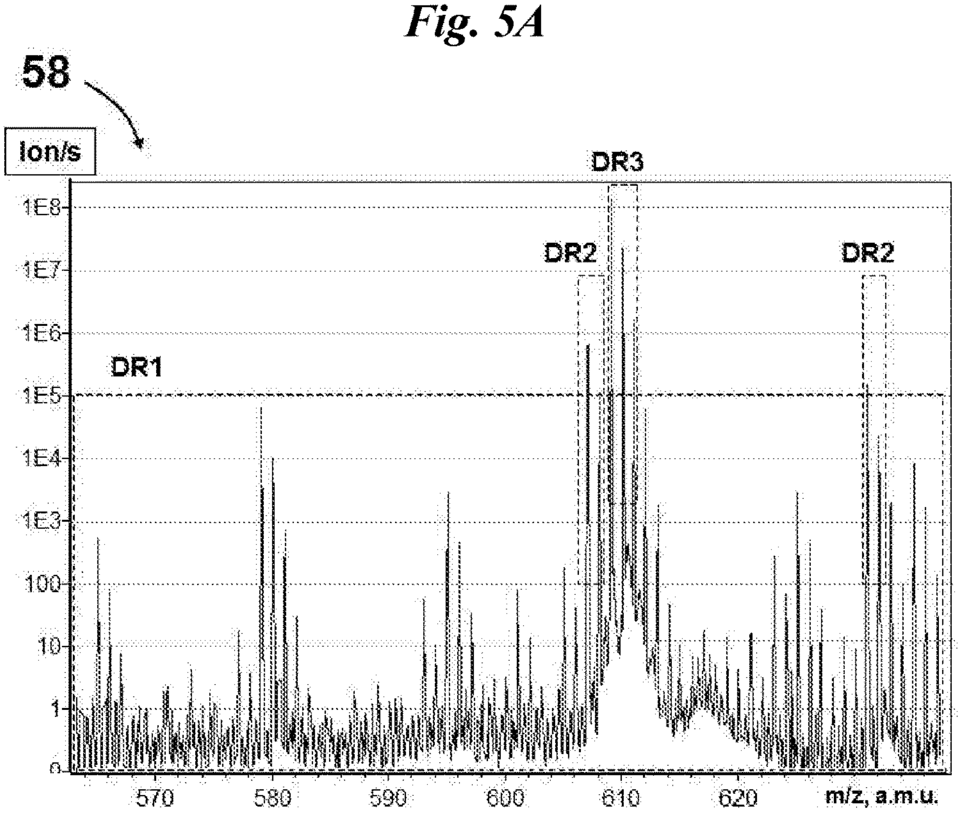
FIG. 5B shows a model reconstructed overall spectrum with a wide dynamic range, illustrating the stitching method, where spectral fractions (particular peaks or peak groups) are extracted from spectra acquired at different segments.

Referring to FIG. 5B, a model spectrum 58 illustrates the method of stitching spectral fractions at reconstruction of the overall mass spectrum. The spectrum is called a "model", since it provides graphical representation of signals in a wide range of relative intensity, while the spectrum has been actually acquired in multi-reflecting MRTOF MS at longer (−100 second) summation time while using initially suppressed and non-saturating ionic signals in combination with a standard counting ADC.

Referring back to FIGS. 2 and 3, the spectral reconstruction may be made at post-processing on the PC 39, or in an equivalent video board, or in a ADC processor, presented by examples 30A to 30-C of data acquisition system, wherein the overall spectrum may be reconstructed while using spectra acquired within all acquisition segments of the preceding acquisition cycle and extracting sound peaks.

The stitching method proposes extracting spectral fractions, corresponding to ranges of ion flight times, including either group of MS peaks or a single MS peak with surrounding isobars. Those spectral fractions are extracted at post-processing from previously recorded mass spectra within different acquisition segments, where intense spectral peaks are extracted from segment 42 at DR3, intermediate intensity peaks are extracted from segment 44 at DR2, and low intense peaks are extracted from segment 46 at DR1, as shown in FIG. 5B.

It is understood that the proposed method can be used with a yet larger number of acquisition segments and/or a larger span of SE coefficients (e.g. employing yet stronger electron suppression factors), this way covering yet wider dynamic ranges such as for when TOF technology may provide yet higher intensity ionic signals.

Embodiments allow for partial compensation of space charge effects within the TOF MS analyzer. A potential in TOF MS analyzer may be switched between acquisition segments, so as to shift the time-focal plane, this way compensating shifting of the time-focal plane by space charge effects depending on the ionic rate λi. This in turn would require individual mass calibrations of spectra from different segments, but would improve TOF resolution for strong ionic signals taken from spectra with stronger suppression of secondary electrons (smaller SE factors).

The acquisition method described herein may provide robust, quantitative, and reproducible operation of the secondary electron suppressor 25 of FIG. 2. Embodiments allow switching the electron transmissions from nearly unity SE=1 (i.e. 100% transmission) down to SE=1E-4 or lower between acquisition segments, optionally on a millisecond time scale. The shortest data acquisition segments (42-45) may last for tens of milliseconds. The suppressor 25 may be isochronous, i.e. not spreading fast electron pulses for more than a fraction of a nanosecond so as to retain TOF MS resolution. When switching between different SE transmission regimes, the electron delay within suppressors shall be reproducible and calibrated, to account for such time shifts at spectral post-processing. Optionally, the same or similar suppressor shall be operable as a very fast time gate, at time scales of a few tens of nanoseconds or less, so that acquisition segment boundaries may be set between isotope peaks with a mass difference of 1 amu, corresponding to an approximately 50 ns time window in a singly reflecting TOF and to a 500 ns window in an MRTOF.

Figure 6A:
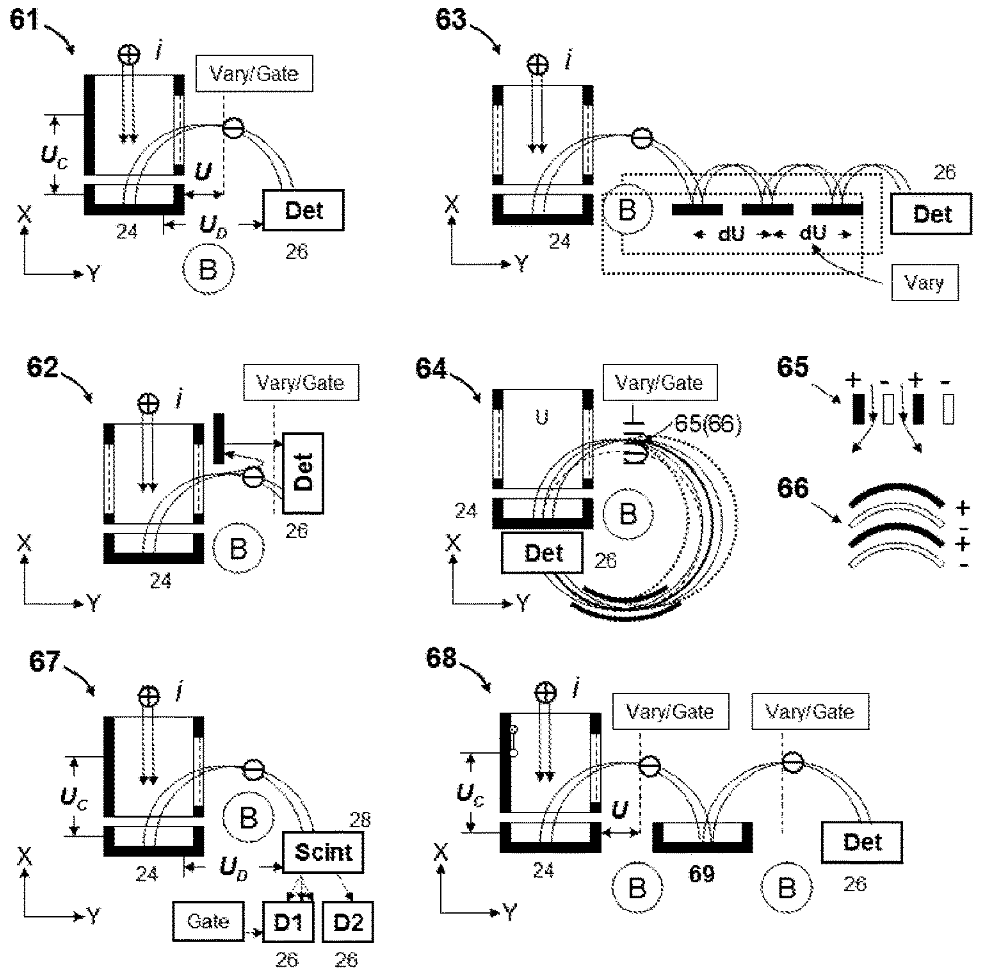
FIG. 6A shows several embodiments of electron suppressors.

Referring to FIG. 6A, there are shown several non-limiting examples of electron suppressors 61-68 which may be used individually or in combination or in cascades for reaching yet lower SE values. Note that all of the shown suppressors operate downstream of an ion to electron converter 24, which may be floated by a negative voltage $U_C$ relative to the TOF drift space. Side extraction of the secondary electrons in a downstream direction towards a detector may be assisted with a magnetic field B. Optionally, the electron turning angle caused by the magnetic field is chosen to be either 180 or 360 degrees for at least three reasons: for improved isochronicity of electron transfer; to reduce signals of secondary ions; and to reduce further conversion cascades by secondary ions from exposed electrode surfaces. Also note that the preferable plane for electron turning lies in the XY plane (same plane shown in FIG. 2), i.e. orthogonal to the Z-direction of the ion packet elongation, so as to minimize time per spatial aberrations. Particular detector 26 may be a PMT or PD so as to extend the life-time, or may be an MCP or SEM to improve detector speed.

Embodiment 61 employs an electron suppressor 25 with a single mesh that is maintained at a variable voltage U (relative to the potential of the converter 24). Varying the potential U allows both varying the level of energy retarding of the electrons and for changing the orbits of secondary electrons.

Embodiment 62 employs a principle of energetic scattering of electrons on metal surfaces, which may also be caused by the process of a more energetic secondary electron emission, compared to the energy of primary electrons. First generation electrons from the ion to electron converter 24 are retarded by a mesh potential, they hit a conversion dynode (optionally planar metal for converter robustness) and emit (or back scatter) higher energy electrons, which penetrate through the mesh towards the detector 26.

Embodiment 63 is similar to embodiment 61 but employs a principle of secondary electron multiplication by impacting the electrons on a dynode that generates electrons that impact on a downstream dynode, which may in turn generate electrons that impact on further downstream dynode, which may in turn generate electrons that impact on a detector 26. Fewer of greater numbers of dynodes may be used than depicted. The gain per dynode may be set at either G~1 for nearly full transmission, or at G<1 for electron suppression. This may be achieved by adjusting the potential drop per stage (e.g. from dU-200V for G=1 to a lower voltage for G<1). Optionally, the dynodes are made of conductive material, like stainless steel, graphite, or carbides, being stable against carbon contamination at electron bombardment and not requiring special non-stable coatings with enhanced electron yield.

Embodiment 64 employs angular and energy filtering of secondary electrons by either energized or equipotential sectors with bipolar deflector 65 (to vary the SE), which also could be a curved deflector 66 made of sectors, used e.g. to reduce the amplitude of the applied potential. The suppressor is expected to operate at a few tens of Volts at bipolar deflection which allows using fast (100 MHz) transistors for rapid gating of relatively wide electron flows. Though even kilovolt signals can be technically switched with FTMOS transistors at tens of nanoseconds, only lower voltage switches are capable of operating at fast repetition rate which is needed for gating multiple mass peaks per spectrum.

Embodiment 67 is similar to embodiment 61 except that the electrons from the converter 24 impact on a scintillator 28 so as to produce photons. The signal of secondary photons may be rarified as well if using a scintillator 28 and unevenly splitting fast fluorescent light between two detectors 26. Detector 1 (Det1) may receive most of the fluorescent light and may be either protected against saturation by either active or passive circuits, promptly shutting amplification gain of Det1 at strong signals or by using pulsed suppression of strong signals, detected within previous acquisition period or within previous acquisition segment, as described below.

Embodiment 68 is similar to embodiment 61 but proposes using an intermediate electron to electron converter 69 between the converter 24 and detector 26. A mesh may be provided between converter 24 and converter 69, and a mesh may be provided between converter 69 and detector 26. The potentials applied to the meshes may retard and/or gate the onward passage of electrons so as to provide either cascading electron suppressors (used e.g. for accurate control of SE factor) or for removal of mass dependent factors in electron suppression, if any occur.

There may be used multiple other methods for suppressing electron flows, such as using a transparent mesh for electron to electron conversion, angular collimation (for example by deflecting electrons between paths with different apertures), controlling electron energy at impinging detector, etc. Rough estimates of technical parameters of suppressor components tell that those suppressors are expected to satisfy the major requirements on speed, reproducibility and the range of electron suppression factors.

Though little has been done to optimize the suppressor design, the optimization job is viewed as a straightforward engineering effort, operating with the domain of already existing data on secondary ion and electron processes and with ion optical simulations. Such optimization shall be targeting: (a) sub-nanosecond isochronicity of electron transfer relative to ten volt energy spreads and relatively to few mm widths of electron beams; (b) adjustment between SE=1 to SE=1E-4 at relatively slow (nearly static) transition times; (c) fast (tens of nanoseconds) switching at few tens of volts signal amplitudes for arranging frequently operating gates (high MHz range); (d) removing undesired parasitic secondary electrons from exposed surfaces and from ionized residual gas; and (e) suppressing parasitic secondary ion to ion and ion to electron cascades from exposed surfaces; (f) reaching uniformity of suppression factors SE and the transmission delays dT versus ion mass and charge, so as on ion position on the converter 24.

Figure 6B:
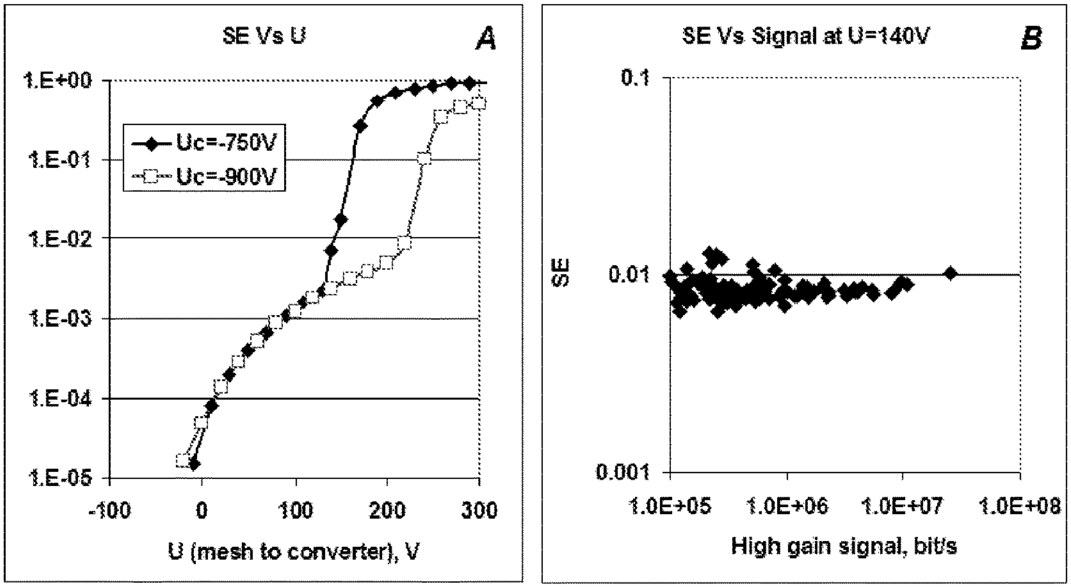
FIG. 6B shows experimental data for suppressing factors SE of the suppressor 61.

Referring to FIG. 6B, graphs A and B present results of experimental testing of suppressor 61 of FIG. 6A. Graph A shows SE as a function of the potential U of the gate mesh relative to the converter 24. Apparently, SE(U)~1 (i.e. secondary electrons are well transferred) at a positively biased mesh that is say at U>180V for a converter voltage Uc=−750V (i.e. the data shown as filled diamonds). At smaller mesh voltages the transmission factor SE drops down to SE=1E-5 at U~0 (relative to converter). Setting an intermediate voltage of say U=140V adjusts the SE to SE~1E-2. Electron transmission appears independent of both primary ion mass and primary ion intensity, as illustrated by graph B, where individual points correspond to various ionic peaks in a wide range of m/z and intensity. Thus, slow adjustment of the mesh voltage allows regulating SE, while pulsing the mesh voltage is expect to suppress individual mass peaks, if pulsing circuits are fast enough. Graph A confirms that switching electron transmission by 100 fold may be achieved at voltage pulse amplitudes under 100V, which for example allows using fast switching circuits and MHz range FTMOS for achieving both the low transition times (e.g. under 10 ns) and high repetition frequency (e.g. MHz range) necessary for suppressing multiple selected peaks.

The gating of strong signals is proposed for two reasons: (a) for saving the detector life-time; and (b) preventing saturation of the detector, of the preamplifier, and of the data system.

Figure 7:
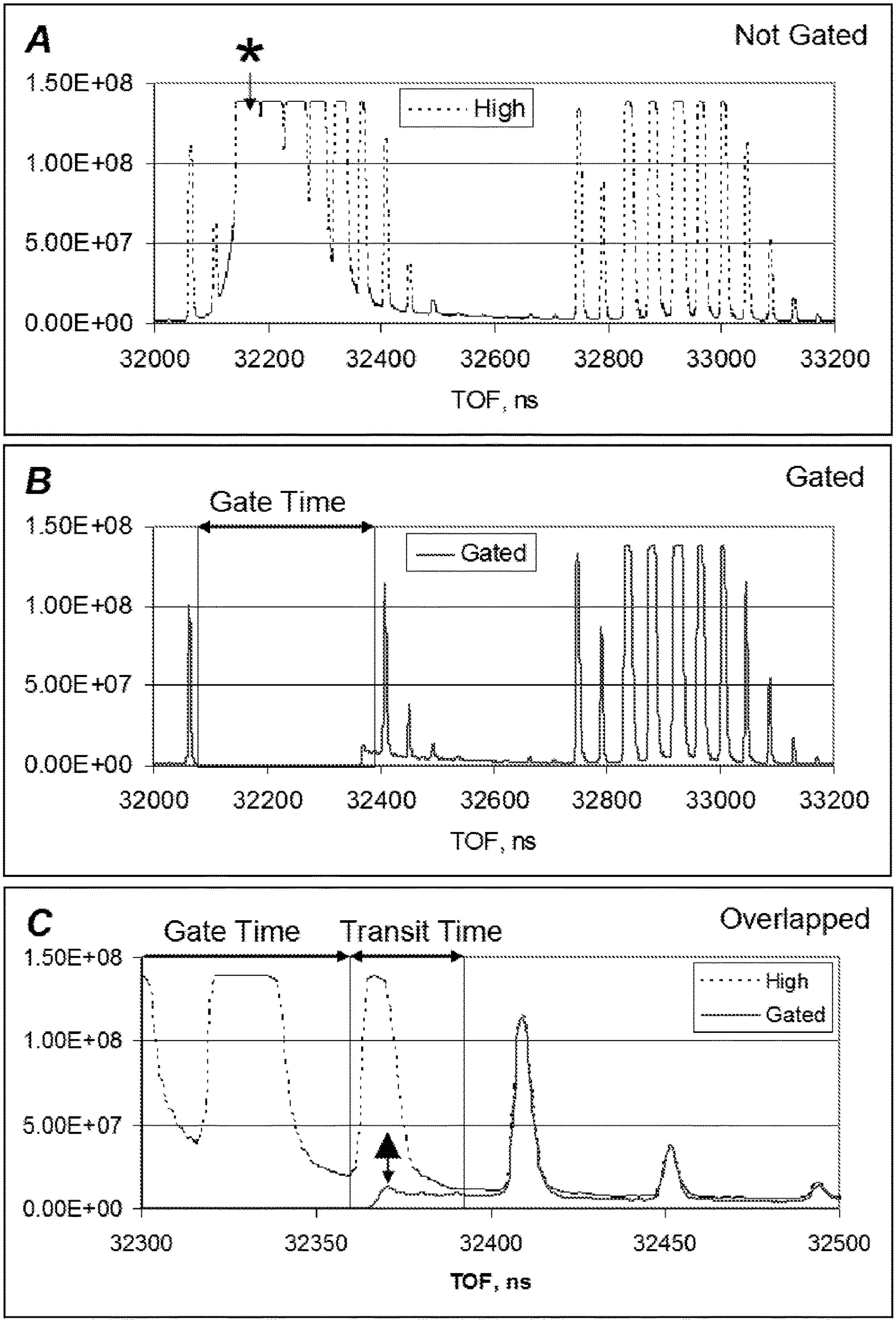
FIG. 7 shows experimentally acquired time-of-flight spectra without (A) and with (B) pulsed gates for electron suppression at time of strong ionic signal; The zoom view C compares both spectra A and B and shows effects of spectral distortions at gates transition times to show benefits of an intelligent processing for gate timing, preferably being spaced between mass spectral peaks separated by at least as low as 1 amu.

Referring to FIG. 7, there are illustrated the effects of pulsed electron suppression on mass spectra composition, shown with few closely spaced isotopic groups and at linear vertical scale (not to be confused with the exponential numbers of ADC ct/sec). All spectra are acquired at a high electron transmission of SE~1. Top spectrum A is acquired without pulsed suppression, middle spectrum B is acquired with pulsed suppression, and bottom graph C compares both spectra of A and B at a finer zoomed time scale. The spectra were acquired with a singly reflecting TOF, using hybrid M-TOF detector (manufactured by El-Mul), a 5303 ADC (made by Acquiris) and a data system similar to 30-C in FIG. 3. FIG. 7 illustrates the need for intelligent setting of gate times, so that the gate transition time may be positioned between signals of isotopes, which is proposed to be achieved by measuring times of strong peaks in advance (say in a prior segment) and using intermediate spectral processing.

At SE=1 the ADC is strongly saturated by several mass peaks and in particular by the mass peak marked by an asterisk in spectrum A. By applying a fast 150V amplitude pulse to electron suppressor 61, e.g. generated with a FTMOS pulse generator, the electron flux is strongly suppressed at times denoted as “Gate Time” in spectrums B and C. As shown in spectrum B, this removes (or strongly suppresses) secondary electrons for intense ionic signals, without affecting all other isotopes, even though spectra are acquired in a singly reflecting TOF with relatively short flight times (approximately 30 us) and small spacing of 40 ns between isotopes.

Two previous spectra are overlapped and compared in spectrum C with zoomed time scale. While strong signals are suppressed within the gate time, mass peaks outside of the gating time are not distorted in all relevant aspects, i.e. the peaks retain their intensity, mass centroid, and peak shape. A slight difference in the baseline shape under the peaks was found to be produced by a slow luminescence of scintillator, i.e. the base difference reflects the true physical difference. The gating pulse may have an approximately 20 ns transition time on both the rising and falling edges. The transition time is marked on spectrum C. During the transition time the SE factor recovers from being very low (estimated under 1E-4) via an intermediate SE, producing a small signal of one isotope, which is marked in Spectrum C by a triangle. Fast (e.g. ns time) electron transmission and the absence of memory effects allow rapid switching of the SE function at flight time gaps between isotopes. In other words, gating the suppressor allows selective removal of individual ionic peaks or peak groups without distorting the rest of the spectrum and not distorting mass peaks at 1 amu difference.

The acquisition method described herein acquires several spectra at different electron transmissions SE for recovering the overall spectrum in a wider dynamic range. When acquiring spectra at higher SE factors (say, SE=1) it is expected that at least one mass spectral peak may produce a signal that saturates the detector. Embodiments may use either detectors with active or passive circuits for overload protection, or may use pulsed gates for suppressing electrons at times of strong ionic signals.

Referring back to FIG. 7, mass spectra were recorded with a hybrid M-TOF detector (made by El-Mul) with a fast scintillator and 9880 PMT (made by Hamamatsu). Comparing the spectral shapes one can tell that the commercial PMT already has sufficient passive suppression circuits for instant recovery of PMT amplification gain, and the 5303 ADC (made by Acquiris) has an effective clamp amplifier, which allows instant recovery of ADC linearity after strong saturations. Even though passive protection works at least for about 30-fold overload, still, the suppressor may be pulsed to increase the life-time of the detector. Thus, overload protection is desired and is available for a number of detectors, but it alone is not sufficient for the ultimate detection system.

Referring to FIG. 7, the tested pulsed suppressor works sufficiently fast to allow suppression of individual isotopes (without affecting the adjacent isotopes), where transition times (e.g. estimated as 20 ns) are shorter than typical time spacing between adjacent isotopes (e.g. 40 us) in a singly reflecting TOF MS. In real analyses, when spectra cannot be predicted, the challenge is setting the gate timings before the strong signal has occurred and to place the gates in the correct place in the spectrum (relative to the OA trigger) so that the overall spectrum may be recovered without spectral distortions. In other words, the gates may be desired to be set in an intelligent manner, rather than being reactive.

To understand this challenge, let us analyze the technique in U.S. Pat. No. 9,214,322, where electrons are delayed between amplifying stages to automatically suppress electron flow at the occurrence of strong signals. The approach hits several problems: (i) to detect strong signals, the first amplifying stage shall be at relatively high gain already and may be aged itself when operating in truly wide dynamic range; (ii) the required electron delay shall be in the range of 20-30 ns to allow switching the suppression to a new steady state, which in turn, requires a long transfer line for electrons and produces time spread being a fraction of the delay, i.e. expected to affect TPF MS resolution; (iii) depending on mass peak combinations (e.g. presence of isobars or closer spaced multiply charged peaks), an automatically controlled inter-stage suppressor is likely to produce disturbances of mass spectra at transient times with unpredicted (or non-recoverable from gate suppressed spectra) spectral position of those transient times; and (iv) the method does not propose adjusting electron suppressor at several calibrated suppression factors, and the method is poorly compatible with such adjustment, which will produce difficulties at reconstruction of the overall spectrum in a wide dynamic range.

Embodiments of the present invention proposes a different method, where strong signals are detected at the output of the main detector ahead of applying gates, e.g. in the previous acquisition period or in the previous acquisition segment. This provides full mass spectral information for calculating an appropriate gating time and provides sufficient processing time between acquisition segments. The detector aging may be prevented by starting with an acquisition period at a small SE transmission factor, and by gating strong signals in further acquisition segments with ascending SE.

Once having sufficient time for processing (e.g. arranged with segmented acquisition shown in FIG. 4), the processor may calculate the optimal gating times, while accounting the prior measured or the preset information on the generator switching time and the minimal period between pulses posed by electronics, on the spectral peak width and on the time spacing between mass peaks with 1 amu mass difference as a function of the flight time, so as to account all other relevant spectral information, such as intensity range and intensity ratio between closely spaced peaks.

Referring back to FIG. 2, now the architecture of the data system 30-A may be understood as a closed loop architecture, which allows detecting signals, processing signals, adjusting SE factors, and forming gate pulses. The data system 30A also presents a novel processing circuit 33 denoted as FPGA, which allows using commercial electronics for the rest of acquisition system 30-A while producing a real time control system. FPGA 33 is proposed to serve the following functions:

i) Periodic triggering of pulse generator 35 for firing ions from the OA and for synchronizing ADC 38, while being finely synchronized by the clock 34;

ii) Calculating the number of OA pulses per acquisition segments 42-46, accounting preloaded instructions from PC 39 and forming either a signal bit or mixing in an additional ADC signal, so that the PC may recognize the number of the segment at spectral processing;

iii) Sending commands to analog signal generator 36 to adjust the electron transmission factor SE on the electron suppressor 25 between acquisition segments;

iv) Recording flight times of strong signals, which trigger threshold discriminator 32;

v) Calculating gating times, while accounting spectral information, or receiving spectral processing results from previous acquisition period;

vi) Triggering gate pulses from generator 37, being finely synchronized by the clock 34. In turn, gating pulses protect the detector 29 against ageing or overload.

FPGA 33 is proposed to operate with the own control loop, while a separate and slave controlled loop may be used for periodically acquiring spectral signals by ADC 38 with following asynchronous post-processing by PC 39. To synchronize the ADC-PC loop, FPGA 33 may provide triggers to fire the OA and ADC; provides to the PC (via the digital line shown by dashed line) sufficient information on the duration of acquisition segments, or mixes in tag signals to ADC input; passes to the PC the information on used SE factors and on gate timing. Then PC has all the necessary information for reconstructing overall spectra in wide dynamic range.

Referring back to FIG. 3, alternative data acquisition systems 30-B and 30-C provide similar functionality. System 30-B is very like system 30-A, except FPGA 33 is moved to ADC 38, since commercial ADCs have a powerful FPGA already. The system is more economic, but a barrier is associated with firmware programming by companies producing commercial ADCs.

The system 30-C is even more economic, since it employs a much less complex clock 34 in combination with PC spectral processing and setting pulse times. The PC may be readily programmed at high level language. However, the system is expected to be slower, since the PC does not operate in real time and long calculation segments 42 and 44 shall be used for safe account of non-predictable PC delays.

Referring back to FIG. 2, the acquisition method described herein has been tested using an API source and interface 21 and a singly reflecting TOF MS 22 with an orthogonal accelerator OA. The TOF MS operates with T=60 us period. Detector 23 comprises: an ion to electron converter 24; an electron suppressor 25, build as suppressor 61 in FIG. 6A; a scintillator 27 (made by El-Mul); and a 9880 PMT (made by Hamamatsu) photon multiplier 28. Mass spectra are acquired with a 5303 model 12-bit ADC (made by Acquiris) 38, assisted by home made clock 34 and with a data system similar to 30-C in FIG. 3. The data system allows adjusting the electron transmission SE of the suppressor 25 between acquiring of summed spectra per individual acquisition segments. The dynamic range has been improved by varying the SE factor as shown in FIG. 5A and then by spectral stitching as shown in FIG. 5B.

Figure 8:
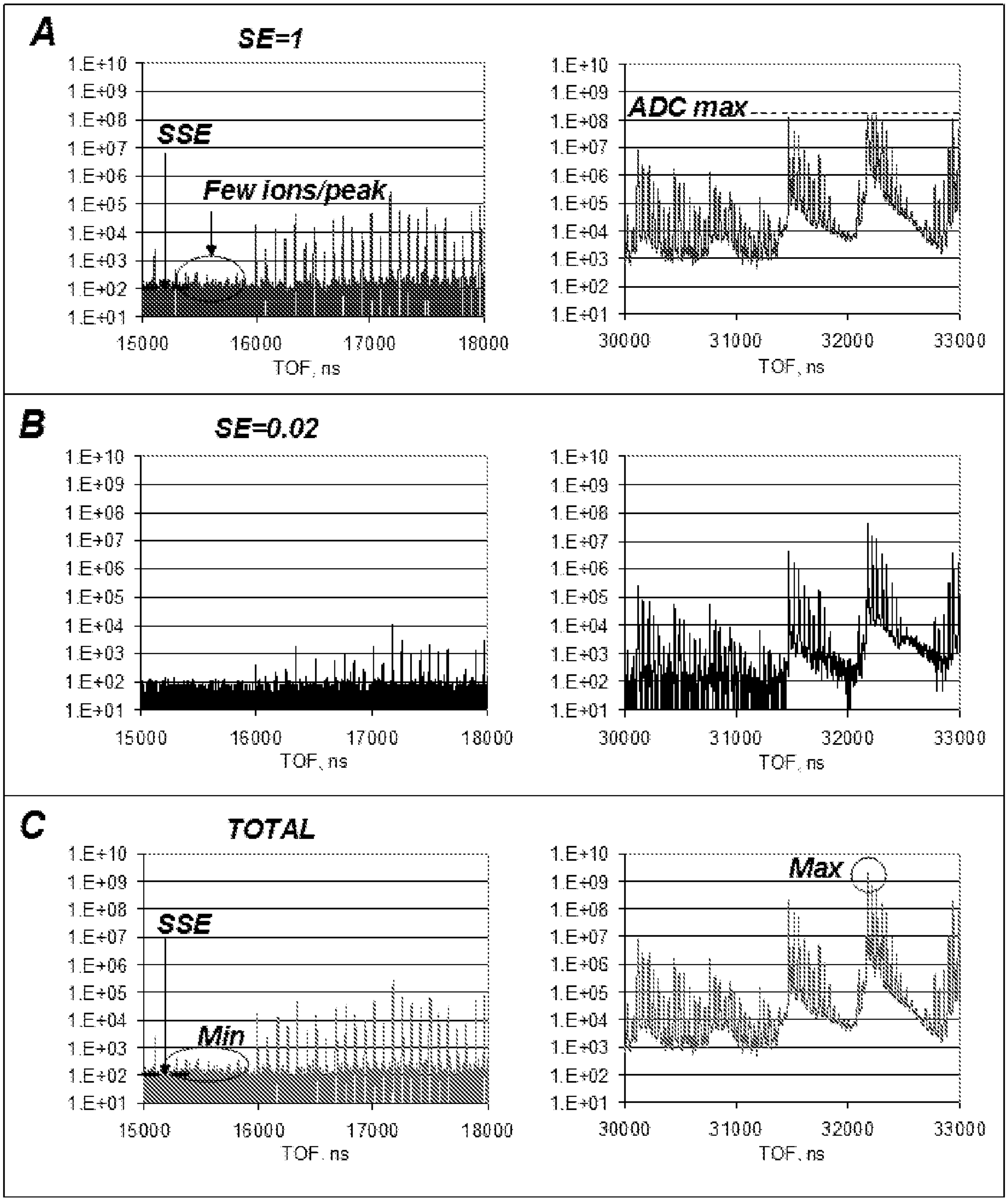
FIG. 8 illustrates the method of extending the TOF MS dynamic range with exemplary experimental time-of-flight spectra, acquired at different electron transmission factors SE (SE=1 in spectrum A, and SE=0.02 in spectrum B) and combined into a wider dynamic range spectrum C by stitching algorithm shown in FIG. 5B.

Referring to FIG. 8, experimental mass spectra were acquired in a singly reflecting TOF at electron transmissions SE≅1 (spectrum A) and SE=0.02 (spectrum B), and then an overall mass spectrum (spectrum C) is reconstructed using both spectra A and B, while following the spectral stitching method shown in FIG. 5B. The left column presents zoomed views of low intensity peaks (suppressed by an RF ion guide in the interface) at smaller m/z (around 100 amu) corresponding to flight times (TOF) from 15 to 18 us. Using perfume fumes, the most intense peak at 371 amu occurs at a 32 us flight time, shown in the right column for TOF range from 30 to 33 us. For clarity, the left and right columns present zoomed views for different mass ranges of the same spectra.

The vertical scale is shown in ADC counts per second (ct/s), which should not be confused with ionic flux, here denoted as "ion/s". In difference with FIG. 3, which considers a 2048 ct/shot vertical scale for common 12-bit ADC with a vertical scale spread over two signal polarities, the 5303 model 12-bit ADC has a higher (8,192 ct/shot) vertical scale, corresponding to 13 effective bits, where the signal is unipolar and the ADC produces an additional bit by half of a least significant bit (LSB) threshold adjustments between shots. At a 16,667 kHz repetition rate, the ADC saturates at 1.36E+8 ct/s, denoted as "ADC max" in spectrum A. The PMT gain and scintillator gain are adjusted so that an average single secondary electron produces 100 ct high signal (SSE=100 ct). The ADC threshold is adjusted to 30 ct (2 mV at 500 mV full ADC scale) to cut off the vast majority of ADC and analog electronics noise, so as to substantially suppress individual photons produced by minor, though still finite slow luminescence of the M-TOF scintillator. In other words, the acquisition system is adjusted to count individual secondary electrons with the ADC, as has been described in FIG. 1. The system is capable of detecting mass spectral peaks, composed of a few (e.g. 3-5) ion/s as seen in the left column in spectrum A. However, at those settings the ADC saturates at 1.36E+6 stacked signals of individual electrons (1.36E+8/SSE), corresponding to approximately 3E+6 electrons/s/peak, accounting that mass spectral peak is about twice wider than single electron peak width.

As seen from spectrum A, acquired at full electron transmission SE≅1, the ion flow in the tested TOF MS is too high for an ion counting ADC, and a group of isotopes at about TOF=32.2 us saturate the ADC. To record the most intense peaks, spectrum B is acquired at a reduced SE=0.02, where the most intense mass peaks reach 5E+7 ct/s height, occupying less than half of the vertical ADC scale. Accounting 1/SE=50, this allows calculating the intensity of ion flow as 5E+7 ion/s per major isotope and approximately 1E+8 ion/s per isotopic group.

Finally, overall spectrum C is reconstructed with the spectral stitching method of FIG. 5B, where spectral signals below 1E+7 ct/s are taken from spectrum A, and the rest of signals are taken from spectrum B and multiplied by 1/SE=50 factor. The maximal recovered mass peak corresponds to 5E+7 ct/s height and 1E+8 ct/s area at SE=0.02 in spectrum B, being recovered in spectrum C to 2.5E+9 ct/s height and 5E+9 ct/s area. The minimal recorded mass spectral peaks (denoted by Min in spectrum C) correspond to 250 ct/s height and 500 ct/s area (5 ions on average), seen above 100 ct amplitude noise, produced by random single electrons with SSE=100 ct.

The resultant spectrum C provides an improved dynamic range of the data system DR(DAS)=2E+7/sec, defined as a ratio of maximal height 2E+9 ct/s of recovered signal to the amplitude of spectral noise by random electrons at SSE=100. The in-spectrum dynamic range is DR(TOF) =1E+7/sec, defined as a ratio of the major recorded mass peak at 5E+7 ion/sec to minimal mass peak at 5 ion/sec, recognized over noise. The demonstrated dynamic range strongly exceeds the DR=1E+5 of the prior art, while yet higher dynamic ranges may be reached with the data acquisition methods described herein, if using stronger signals, yet larger number of acquisition segments, and/or yet larger range of SE factors.

Spectrum C in FIG. 8 reveals local rising of the signal base line, called "hump" under medium and strong intensity peaks. Such humps are poorly seen in linear vertical scales, typically used for mass spectra presentation, but they are well seen with logarithmic vertical scale. Applying threshold in DAS, so as acquiring of short spectra prove that those hump signals are produced by ions. Though such humps potentially could be produced by TOF aberrations or parasitic signals of the detector, experimental studies have shown that the vast majority of the hump signal is produced by ion collisions with residual gas, causing ion scattering and ion fragmentation. Those humps increase with ion molecular weight (cross-section varies from 30 $A^2$ for small ions to 1000 $A^2$ for small proteins) and rise at poor analyzer vacuum. Relative intensity of those humps is from 1E-4 to 1E-3 in a singly reflecting TOF and drops to 1E-5 in a multi-reflecting TOF (as seen in the spectrum of FIG. 5B), which filters scattered ions in most of the flight path, so as to provide a wider time spacing between isotopes (approximately 500 ns). The hump level may be more intense (1E-3 to 1E-5) compared to the detection limit (1E-7, potentially extendable to 1E-9) of the data system with strongly improved dynamic range. Those humps may limit isotopic and isobaric abundances, so may limit the detection of minor species located at few amu distance from intense peaks.

Even with the improvements described herein, the true spectral dynamic range may still be limited by ion scattering and ion fragmentation, caused by ion collisions with the residual gas. To reduce the signal of scattered and fragmented ions one may improve the TOF MS vacuum, for example by using differential seals and baked vacuum chambers, which may be referred as an intensive approach.

Figure 9:
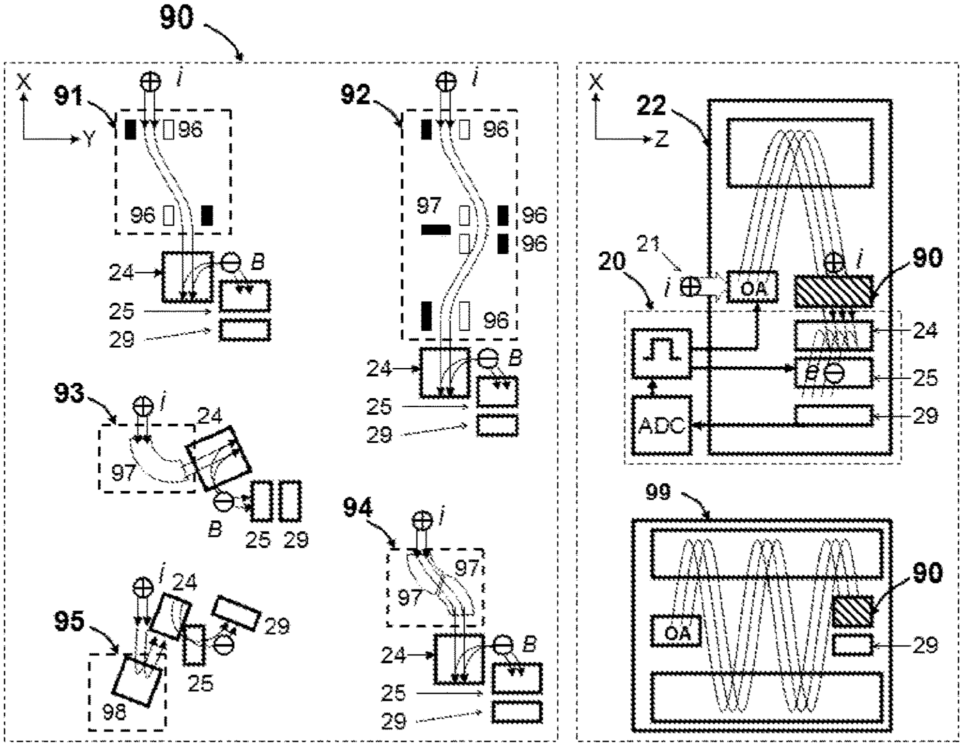
FIG. 9 shows embodiments of a discriminator of ions that have collided with residual gas within TOF analyzer; the discriminator is expected to improve isotopic and isobaric abundances in spectra with wide dynamic range.

Referring to FIG. 9, embodiments of the invention propose an extensive solution with a filter 90, which steers, reflects, deflects or temporary decelerates the detected ions within a much shorter flight path relative to TOF MS flight path. This is expected to strongly reduce the number of ion collisions with gas within the filter compared to the number of collisions in the TOF analyzer. Optionally, the filter 90 is arranged immediately in-front of the detector 29 or right in-front of the ion-to-electron converter 24. The filter is expected to discriminate scattered and fragmented ions and fast neutrals, produced within TOF MS path, accounting their wider spatial, angular and energy spreads.

The left part of FIG. 9 shows various embodiments 91-95 of the filter 90. The right part of FIG. 9 presents an XZ plane view of TOF 22 with orthogonal accelerator OA (as in FIG. 2) and also an exemplary multi-reflecting TOF 99 with an orthogonal accelerator OA. Those TOF examples are not limiting, and filter 90 may be applied to any type of TOF, including TOF MS with pulsed ion sources, like MALDI or SIMS, or TOF MS, employing different pulsed converters, such as axial or radial ejecting RF ion trap, etc.

Exemplary (though not limiting) embodiments 91-95 of filter 90 are presented in the XY plane view. The filter 90 of scattered and in-flight fragmented ions may comprise at least one pair of deflection plates 96, at least one electrostatic sector 97, or at least one ion mirror 98. Optionally, ion deflecting or ion reflecting components are arranged for mutual compensation of time-per-spatial aberrations, as in case of dual deflectors 96 in embodiments 91 and 92, or as in case of dual sectors 97 in embodiment 94. Alternatively, time per spatial aberrations of the generic filter 90 may be compensated within a gridless OA, within gridless ion mirrors of TOF 21 and MRTOF 99, or with curved conversion electrode of the ion to electron converter 24, by selecting and optimizing tilting angles and field curvatures, following known ion optical optimization procedures.

Experts in TOF MS field have long recognized that there are two major factors limiting TOF resolution: the turn-around time in the ion source (TAT) and the detector time spreading (DET), where the third earlier considered factor (aberrations of the analyzer) can be compensated to a much lower level, having meniscus effects on the resolution. By raising the acceleration voltage, the balance between TAT and DET factors shifts, where the detector limit DET becomes dominating. The result is well trusted when comparing resolutions obtained on commercial TOF MS with TDC and ADC data systems, on average differing by a factor of two.

Using of multi-channel (64 to 128 channels) TDC could be a savior by providing the dynamic range of 12-bit ADC while retaining TDC time resolution. However, a detector with TDC having large numbers of channels hits technical problems, such system is much more expensive and it is not used in commercial TOFs. Since ADC systems are dominating over TDC for higher dynamic range, attempts have been made to improve ADC resolution by determining peak centroids at every waveform (shot) or by using a combination of ADC and TDC, as described e.g. in U.S. Pat. Nos. 6,627,877, 6,870,156, 8,723,108, and 8,785,845. The resolution is improved for weak intensity peaks, but medium and large intensity peaks at $\lambda i>1$ are distorted and mass shifted, while close isobars are merged.

Figure 10:
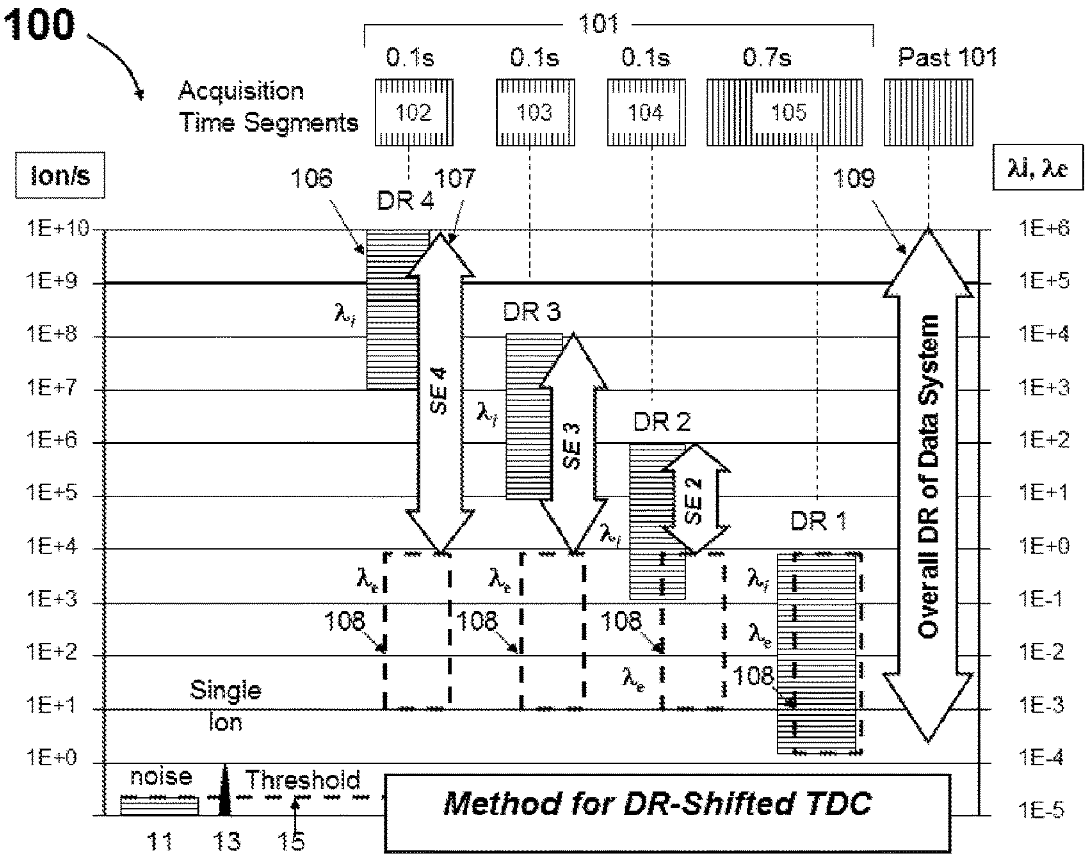
FIG. 10 shows dynamic range diagram for an embodiment of the present invention, designed for implementing with either ADC or TDC at Δe≤1 for digital counting of electrons; the method is designed to improve TOF MS resolutions by reducing the effect of the detector time spreading.

FIG. 10 shows another embodiment of the data acquisition method 100 which provides yet an additional opportunity of improving TOF MS dynamic range, while also improving TOF MS resolution by using a TDC data system with sequentially shifted dynamic ranges (for ion rates, not electrons), or using an ADC where extracted signals are taken at $\Delta e\leq 1$ and peak centroids are measured in each waveform, this way producing TDC-type signals (centroid histograms) for compensating the detector time spread.

Similar to method 40 in FIG. 4, the data acquisition is arranged periodically with acquisition periods 101, being split into the shown segments 102-105. Each segment is characterized by the individual factor of secondary electron suppression SE, shown as being SE4=1E-6; SE3=1E-4; SE2=1E-2; and SE1=1, so as to cover different dynamic ranges of ion rates 1E+6>$\lambda i$>1E+3 in DR4; 1E+4>$\lambda i$>10 in DR3; 1E+2>$\lambda i$>1E-1 in DR2; and 1>$\lambda i$>1E-4 in DR1, while keeping rates of secondary electrons $\lambda e\leq 1$ and for extracted at post-processing fractions of mass spectra, i.e. for individual mass peaks or for groups of mass spectral peaks taken from all acquisition segments.

Spectra from all segments 102-105 are used to reconstruct the overall spectrum while using spectral stitching algorithm, similar to one shown in FIG. 5B. The reconstructed spectrum is expected to cover a strongly extended dynamic range, here shown approaching DR=1E+9/sec, for a particular example of segments timings, where segments DR4 to DR2 each take 0.1 s and segment with DR1 takes 0.7 s. Setting $\Delta e\leq 1$ for all segments assumes applying dead-time saturation correction algorithms for centroid shift per signal counting rate. Those correction algorithms are expected to be further enhanced, since the same peak information is obtained in segments with different SE for more reliable measurement of ion signal rates.

Again, similar to method 40 of FIG. 4, when acquiring signals at higher electron transmissions, the detector saturation may be avoided either by using passive or active circuitry for the instant suppression of the detector amplification gain, or alternatively, time gates may be applied to suppress electrons for intense ionic peaks, where gate timing is determined within previously acquired segments or previous acquisition periods.

The methods described herein provide a dramatic positive effect over known methods. Embodiments of the invention solves the problem of acquiring TOF MS spectra without distorting mass spectral peaks and within an unprecedented wide dynamic range. Embodiments may provide a DR=1E+9/s and have been demonstrated herein to provide DR>1E+7/s, whereas the highest reported DR of the prior art is DR=1E+5/s. The embodiment illustrated in FIG. 10 provides an additional positive effect of improving the mass spectral resolution by using an ion counting regime with compensated detector time spreading, now achieved in combination with recording of non-distorted spectra within very large dynamic range.

Embodiments of the present invention may provide the following new features:

(i) suppressing secondary particle transmission for the entire duration of TOF MS spectra for sustaining a particle counting regime of the data acquisition board, either ADC or TDC;

(ii) using a single and the same signal channel for detecting signals of strong ion peaks at rarefied detector signals, further used for calculating timing of suppressor gates and for adjusting transmission factor of electron suppressor;

(iii) using acquisition segments with progressively increasing electron transmission SE and applying gates at higher transmissions to fully ensure absence of the detector saturation and aging;

(iv) computing gate timings based on prior acquired spectra for intelligent gating of secondary electrons at transition times which lie between isotopes;

(v) permanently sustaining ADC or TDC in ion counting mode, while preventing their saturation, and sustaining signals at the entrance of ADC or TDC data systems in the desired range of electron counting (Δe<100 for ADC and Δe<1 for TDC), thus ensuring maximal dynamic range per acquisition time and compensating detector spreading at Δe<1;

(vi) suppressing secondary electrons with SE factor under SE<1E-2 and down to SE<1E-5 to match improvements in transmission of modern ion sources;

(vii) using ion deflectors, sectors or mirror in-front of the detector for discriminating signals of scattered and fragmented ions, produced by ion collisions with residual gas;

(viii) arranging an independent closed loop for electron suppression for combination with commercially available detectors and data acquisition boards.

(ix) using ion to electron converter at moderate ion to electron efficiency close to unity in combination with electron suppressor but without using amplification stages, this way not using surfaces with high electron gain, which otherwise would be susceptible to rapid aging;

(x) using acquisition segments for adjusting detector signals, however, adjusting electron suppression in contrast with prior art solutions, where acquisition segments have been used to manipulate the continuous ion flow or ion packets;

(xi) Optionally using multiple detectors or collectors, or an intermediate detector dynodes, or multiple preamplifier channels, however, for further improvement of the method;

(xii) Pulsed suppression of electron flow at times of strong ionic signals where: (a) the suppressor is downstream of the converter and not downstream of the electron amplifier to avoid amplifier aging; (b) the transition timing of gates is positioned between isotopes rather than being reactively triggered at occurrence of strong signals and in the middle of a strong peak; (c) intelligent computing of gate pulses allows their slower transition times, this way allowing to operate gates at higher voltages for wider range of suppression factors, so as providing an opportunity for accurate setting of suppression factors during the pulse.

Summarizing, embodiments of the invention employ a novel approach to data acquisition, based on repetitive signals and progressive scaling of the electron suppression SE to keep the data system non-saturated and in a counting mode. Embodiments achieve a dramatic positive effect and solve the problem of acquiring TOF MS signals in a wide dynamic range without distorting mass spectra, where the experimentally demonstrated DR is improved by at least factor of 100, while the method provides a theoretically unlimited extension of the dynamic range.

Although the present invention has been describing with reference to preferred embodiments, it will be apparent to those skilled in the art that various modifications in form and detail may be made without departing from the scope of the present invention as set forth in the accompanying claims.

The invention claimed is:

1. A method of time-of-flight (TOF) mass spectrometry comprising:

pulsing a plurality of packets of ions into a time of flight region such that they separate according to mass to charge ratio as they travel towards an ion converter;

receiving the ions from different ion packets at the ion converter over different respective time periods;

converting the ions into secondary particles at the ion converter;

attenuating the secondary particles that are generated during the different time periods by different respective amounts and/or rates, wherein the amount and/or rate of attenuation is maintained substantially constant during each of the time periods; and then detecting the attenuated secondary particles so as to obtain mass spectral data for the ions.

2. The method of claim 1, comprising detecting the attenuated secondary particles so as to acquire mass spectral data over an acquisition period;

wherein said acquisition period comprises a first acquisition time segment during which the secondary particles generated from a first plurality of ion packets, that are consecutively pulsed into the time of flight region, are attenuated by a first constant amount and/or rate; and wherein said acquisition period comprises a second different acquisition time segment during which the secondary particles generated from a second different plurality of ion packets, that are consecutively pulsed into the time of flight region, are attenuated by a second different constant amount and/or rate.

3. The method of claim 2, wherein said step of pulsing comprises pulsing packets of ions into the time of flight region using an ion accelerator, wherein the ion converter receives a number of ions per pulse of the ion accelerator per mass peak $\lambda i$, wherein a range of $\lambda i$ is received at the ion converter during each of the acquisition time segments, and wherein the first and second acquisition time segments are selected to extend over time periods such that the ranges of $\lambda i$ for these time segments are different and partially overlap.

4. The method of claim 2, wherein the attenuation by said first constant amount and/or rate and the attenuation by said second constant amount and/or rate are selected such that the same number of secondary particles are onwardly transmitted for the first and second acquisition time segments.

5. The method of claim 1, wherein the secondary particles are constantly attenuated during the whole of at least one, or during the whole of each, of the time periods or acquisition time segments so as to attenuate the secondary particles by a constant amount in that time period or acquisition time segment.

6. The method of any one of preceding claim 1, wherein the secondary particles are attenuated by pulsed attenuation or gated transmission of the secondary particles during at least one, or during each, of the time periods or acquisition time segments so as to attenuate the secondary particles at a constant rate in that time period or acquisition time segment.

7. The method of claim 1, comprising selecting said amount and/or rate of attenuation to apply during one or more of said time periods or acquisition time segments based on a signal from the secondary particles detected prior to that one or more time period or acquisition time segment.

8. The method of claim 1, wherein the secondary particles are attenuated in said attenuating step by gated transmission with a gate frequency such that the gate transitions between being open and closed, or vice versa, in a timescale that is faster than the time spacing between isotope peaks, in the same ion packet and having a 1 amu difference, being received at the ion converter.

9. The method of claim 1, wherein the secondary particles are electrons, ions or photons.

10. The method of claim 1, wherein the step of attenuating the secondary particles comprises one or more of the following: (i) deflecting or retarding the secondary particles with one or more electric or magnetic field, where the secondary particles comprise charge particles; (ii) converting the secondary particles to the same or a different type of particle with a reduced yield for that conversion; (iii) splitting the secondary particles between at least two light guides, wherein the secondary particles comprise photons.

11. The method of claim 1, wherein the secondary particles are attenuated so that they have a transmission efficiency of: (i) $\leq 10^{-2}$ during at least one of said time periods or acquisition time segments; and/or (ii) $\leq 10^{-4}$ during at least one of said time periods or acquisition time segments; and/or (iii) $\leq 10^{-6}$ during at least one of said time periods or acquisition time segments.

12. The method of claim 1, comprising detecting said secondary particles using an ADC or TDC, wherein said step of attenuating is performed such that individual ones of said secondary particles are counted throughout the different time periods or acquisition time segments using the ADC or TDC, without saturation thereof.

13. The method of claim 12, wherein said step of pulsing comprises pulsing packets of ions into the time of flight region using an ion accelerator, and wherein: (i) the step of attenuation is performed such that the number of secondary particles per pulse of the ion accelerator per mass spectral peak $\lambda e$ received by said ADC is $<100$; or (ii) the number of secondary particles per pulse of the ion accelerator per mass spectral peak $\lambda e$ received by said TDC is $<1$.

14. The method of claim 1, wherein the ion converter converts said ions to secondary particles at an efficiency of $\leq 1$, optionally wherein the resulting secondary particle signal is not amplified downstream of the ion converter.

15. The method of claim 1, wherein the step of attenuating ions comprising progressively increasing the amount and/or rate by which the secondary particles are attenuated for subsequent ones of said time periods or acquisition time segments.

16. The method of claim 1, comprising deflecting, reflecting or retarding ions that have been separated in the time of flight region before they reach the ion converter such that ions that have been scattered or fragmented in the time of flight region do not impact on the ion converter and do not generate said secondary particles, whereas ions that have not been scattered or fragmented in the time of flight region impact on the ion converter and generate said secondary particles.

17. A method of time-of-flight (TOF) mass spectrometry comprising:

pulsing a packet of ions into a time of flight region such that they separate as they travel towards an ion converter;

receiving the ions at the ion converter over a period of time;

converting the ions into secondary particles at the ion converter;

attenuating the secondary particles, wherein the amount and/or rate of attenuation is maintained substantially constant over said time period; and then detecting the attenuated secondary particles.

18. A time of flight mass spectrometer comprising:

a pulsed ion accelerator;

an ion converter for converting ions into secondary particles;

a time of flight region between the pulsed ion accelerator and the ion converter;

an attenuator for attenuating onward transmission of the secondary particles;

a detector for detecting the secondary particles; and control circuitry configured to:

(i) control the pulsed ion accelerator to pulse a plurality of packets of ions into the time of flight region such that ions from different ion packets are received at the ion converter over different respective time periods;

(ii) operate the ion converter to convert the ions into secondary particles;

(iii) control the attenuator to attenuate the secondary particles generated during the different time periods by different respective amounts and/or rates, wherein the amount and/or rate of attenuation is maintained substantially constant during each of the time periods; and (iv) operate the detector to detect the attenuated secondary particles so as to obtain mass spectral data for the ions.

* * * * *